United States Patent
Uruno et al.

(10) Patent No.: US 9,416,227 B2
(45) Date of Patent: Aug. 16, 2016

(54) POLYHYDROXYURETHANE MICROPARTICLES, AND PROCESS FOR PRODUCING SAME

(75) Inventors: Manabu Uruno, Tokyo (JP); Kenichi Takahashi, Tokyo (JP); Kazuya Kimura, Tokyo (JP); Kazuyuki Hanada, Tokyo (JP)

(73) Assignee: DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 0 days.

(21) Appl. No.: 14/111,135

(22) PCT Filed: Apr. 24, 2012

(86) PCT No.: PCT/JP2012/060969
§ 371 (c)(1),
(2), (4) Date: Oct. 10, 2013

(87) PCT Pub. No.: WO2012/150684
PCT Pub. Date: Nov. 8, 2012

(65) Prior Publication Data
US 2014/0030526 A1  Jan. 30, 2014

(30) Foreign Application Priority Data

May 2, 2011  (JP) .................................. 2011-103299
May 13, 2011  (JP) .................................. 2011-108602

(51) Int. Cl.
C08G 71/04  (2006.01)

(52) U.S. Cl.
CPC ........... *C08G 71/04* (2013.01); *Y10T 428/2982* (2015.01)

(58) Field of Classification Search
None
See application file for complete search history.

(56) References Cited

U.S. PATENT DOCUMENTS 2,522,680 A  9/1950  Kropa et al.
3,072,613 A  1/1963  Whelan et al.

(Continued)

FOREIGN PATENT DOCUMENTS

EP  296098 A  * 12/1988
JP  57-202317  12/1982

(Continued)

OTHER PUBLICATIONS

Machine translation JP 2006-009001 (2006).*

(Continued)

*Primary Examiner* — Alexandre Ferre
(74) *Attorney, Agent, or Firm* — Hamre, Schumann, Mueller & Larson, P.C.

(57) ABSTRACT

A problem is to provide polyhydroxyurethane microparticles, which have a narrow particle size distribution and are applicable to a wide range of use. Provided are polyhydroxyurethane microparticles which are spherical polymer microparticles having particle sizes of 0.1 μm to 300 μm. A polymer that makes up the polymer microparticles has in a structure thereof chemical structure units represented by the following formula (1) and/or chemical structure units represented by the following formula (2). In the chemical structure units (1) and (2), —O—CO— bonds have been derived from carbon dioxide.

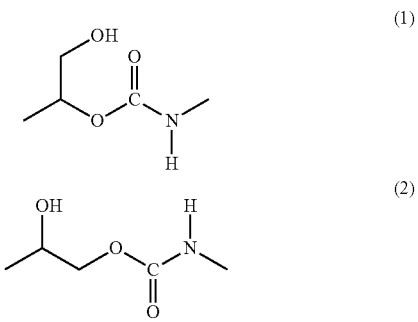

15 Claims, 5 Drawing Sheets

(56) References Cited

U.S. PATENT DOCUMENTS

| 3,084,140 | A | 4/1963 | Gurgiolo et al. |
| 4,892,954 | A | 1/1990 | Brindopke et al. |
| 5,175,231 | A | 12/1992 | Rappoport et al. |

FOREIGN PATENT DOCUMENTS

| JP | 62-045584 | | 2/1987 |
| JP | 3-215504 | | 9/1991 |
| JP | 06-025409 | | 2/1994 |
| JP | 07-010283 | | 1/1995 |
| JP | 7-097424 | | 4/1995 |
| JP | 7-112518 | | 5/1995 |
| JP | 7-91367 | | 10/1995 |
| JP | 7-91368 | | 10/1995 |
| JP | 07-316493 | | 12/1995 |
| JP | 3100977 | B | 8/2000 |
| JP | 2000-319504 | | 11/2000 |
| JP | 2001098047 | | 4/2001 |
| JP | 2007-297544 | | 11/2001 |
| JP | 3489850 | | 1/2004 |
| JP | 3580331 | | 10/2004 |
| JP | 2005-139435 | | 6/2005 |
| JP | 2005154451 | A * | 6/2005 |
| JP | 2006-009001 | | 1/2006 |
| JP | 3801319 | | 7/2006 |
| JP | 3840347 | B | 8/2006 |
| JP | 2007-291157 | | 11/2007 |
| JP | 2007-297544 | | 11/2007 |
| JP | 2008-285539 | | 11/2008 |
| JP | 2008-291143 | | 12/2008 |
| JP | 2011-105827 | | 6/2011 |
| JP | 2003-327854 | | 11/2013 |
| WO | 89/00565 | | 1/1989 |
| WO | 99/65969 | | 12/1999 |
| WO | 03/028644 | | 4/2003 |
| WO | 2012/026338 | | 3/2012 |

OTHER PUBLICATIONS

Machine translation JP 2005-154451 (2005).*
Goméz et al.: "Synthesis of Polyhydroxy [$n$]-Polyurethanes Derived from a Carbohydrate Precursor"; Macromolecules 2009, vol. 42, Issue 21, pp. 8112-8117.
F. E. Kalinina et al.: "Poly(Hydroxy Urethane) Coatings Prepared from Copolymers of 3-(2-Vinyloxyethoxy)-1,2-propylene Carbonate and N-Phenylmaleimide"; Russian Journal of Applied Chemistry, vol. 81, No. 7, Jul. 2008, pp. 1302-1304.
Extended European Search Report, Apr. 23, 2015; European Patent Application No. 15151394.2 (11 pages).

* cited by examiner

POLYHYDROXYURETHANE MICROPARTICLES, AND PROCESS FOR PRODUCING SAME

TECHNICAL FIELD

This invention relates to polyhydroxyurethane microparticles and their production process. Specifically, the present invention is concerned with a technology for providing polyhydroxyurethane microparticles, which are beneficial as a modifier or the like that provides paints, coating formulations, resins, rubbers, elastomers and the like with excellent performance in oil absorption properties, abrasion resistance and so on, and moreover, which can use carbon dioxide as a raw material therefor and can contain the carbon dioxide at high concentration.

BACKGROUND ART

Polymer microparticles have been conventionally used as an industrial material for various applications. Their applications include, for example, rheology control agents and matting agents for paints, modifiers for cosmetics, spacers for liquid crystal displays, shrinkage control agents for resins, column packing material, and toners. In these applications, functions developed by the polymer microparticles so used include those which are derived from raw materials that make up the microparticles and those which are achieved by the shapes themselves of the microparticles. In the case of the above-mentioned column packing materials or toners, for example, the surface properties of microparticles are important so that the function required for the microparticles relies largely upon the properties of the material that make up the microparticles. In matting agents for paints or spacers for liquid crystal displays, on the other hand, the size and shape, which the microparticles have, are themselves used as important functions as is also evident from the use of truly spherical microparticles of uniform particle size.

Conventionally-practiced production methods of polymer microparticles include a grinding method that grinds a resin to a desired particle size and a polymerization method that directly obtains polymer microparticles by emulsion polymerization or suspension polymerization. The polymerization method is useful especially as a method for obtaining spherical polymer microparticles. Many of polymer microparticles employed for industrial applications are spherical, or in particular, truly spherical in particle shape as mentioned above, and moreover, those having a narrower particle size distribution are advantageous because the effects of their addition can be obtained with a smaller amount of addition. From such a viewpoint, as a method for the production of polymer microparticles capable of meeting applications in which high functionality is required, the synthesis of microparticles by such a polymerization method as described above is considered to be a more useful method than the grinding method.

As polymer microparticles which are industrially practiced by the polymerization method these days, microparticles made of materials such as acrylic resins, polystyrene, epoxy resins, polyesters, polyamides and polyurethane can be mentioned. Of these microparticles, polyurethane microparticles are widely used primarily as a modifier for paints and coating formulations because they provide abrasion resistance, solvent resistance, heat resistance, adhesiveness and oil resistance derived from the properties of polyurethane as their base material. It is the polymerization method that industrially produces polyurethane microparticles for use as such a modifier. For example, there have been proposed a process that disperses a polyisocyanate prepolymer in water while using a dispersant and cures it by using a reaction with water (Patent Document 1) and a suspension polymerization process in a non-aqueous system where no effects are received from water (Patent Document 2).

Isocyanate compounds useful as raw materials in such production processes of polyurethane microparticles as described above are industrially produced as diverse compounds. These isocyanate compounds are, however, accompanied by a drawback in that all of them are hazardous materials and are difficult to handle. In addition, phosgene employed in the production of isocyanate compounds is a material of very strong toxicity, so that it is strongly desired to increasingly curtail its use.

On the other hand, processes that react cyclic carbonates and amines, respectively, have been reported as production processes of polyurethane resins which use no isocyanate (Patent Documents 3 and 4). These production processes are characterized in that they use no isocyanate as a raw material, and as the cyclic carbonates that are raw materials, those obtained by using carbon dioxide as a raw material are employed. Therefore, the resulting polyurethane resins are also compounds with carbon dioxide incorporated in their chemical structures. This means that the above-described technology is also a noteworthy technology in another viewpoint of contributing to the reduction of carbon dioxide as one of greenhouse gases that have become a problem in recent years.

Nonetheless, the production processes of Patent Document 3 and 4 are specialized to the production of resin solutions useful as resin binders, and no report has been made yet about a process that makes use of such a reaction for the synthesis of polyurethane microparticles.

PRIOR ART DOCUMENTS

Patent Documents

Patent Document 1: JP-B-3,100,977
Patent Document 2: JP-A-7-97424
Patent Document 3: U.S. Pat. No. 3,072,613
Patent Document 4: JP-B-3,840,347

DISCLOSURE OF THE INVENTION

Problem to be Solved by the Invention

An object of the present invention is, therefore, to solve the above-described conventional problems, and to develop a technology capable of providing polyhydroxyurethane microparticles which have a narrow particle size distribution and can be used in a wide range of applications.

Means for Solving the Problem

The above-described problems can be solved by the present invention. Described specifically, the present invention provides polyhydroxyurethane microparticles, wherein the polyhydroxyurethane microparticles are spherical polymer microparticles having particle sizes of 0.1 μm to 300 μm, a polymer that makes up the polymer microparticles has in a structure thereof at least one of two types of chemical structure units represented by the following formulas (1) and (2), and —O—CO— bonds that make up the chemical structure units, respectively, have been derived from carbon dioxide.

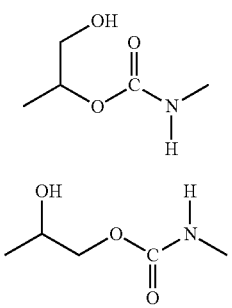

As a preferred embodiment of the present invention, the —O—CO— bonds that make up the two types of chemical structure units, respectively, may have each been formed using as a reactive group a 5-membered cyclic carbonate group synthesized from carbon dioxide as one of raw materials, and the —O—CO— bonds derived from carbon dioxide may be contained at 1 to 30 mass % in the polymer that makes up the polymer microparticles.

As another embodiment of the present invention, there is also provided a process for producing the above-described polyhydroxyurethane microparticles, comprising, upon obtaining the polymer microparticles in a form of being dispersed in an inert liquid by using a compound, which has at least two 5-membered cyclic carbonate groups as reactive groups, and a compound, which has at least two amino groups as reactive groups, homogeneously dispersing these compounds in the inert liquid with a dispersant contained therein, and then heating the resulting dispersion to react both the compounds, using, as one of the compounds, a compound having at least three reactive groups in a molecule, and reacting both the compounds at an equivalent ratio of functional groups, as defined by the following equation, of 0.7 to 1.5.

$$\text{Equivalent ratio of functional groups} = \frac{\begin{pmatrix} \text{mass of the carbonate compound in a composition} \times \\ \text{number of functional groups in the carbonate compound} \div \\ \text{molecular weight of the carbonate compound} \end{pmatrix}}{\begin{pmatrix} \text{mass of the amine compound in the composition} \times \\ \text{number of functional groups in the amine compound} \div \\ \text{molecular weight of the amine compound} \end{pmatrix}}$$

wherein the number of functional groups in the carbonate compound means the number of cyclic carbonate structures which the carbonate compound has in a molecule thereof, and the number of functional groups in the amine compound means the number of amino groups which the amine compound has in a molecule thereof.

Preferred embodiments of the process according to the present invention for the production of the polyhydroxyurethane microparticles include:

the compound having the 5-membered cyclic carbonate groups as reactive groups may have been synthesized using carbon dioxide as one of raw materials, and the —O—CO— bonds derived from carbon dioxide may be contained at 1 to 30 mass % in the polymer obtained using the compound in the reaction, more preferably, 1 to 40 mass % of the mass of the polymer microparticles may be formed of the —O—CO— bonds derived from the carbon dioxide;

as the dispersant, one containing a non-polar moiety and a polar moiety in a structure thereof, said non-polar moiety having a polybutadiene skeleton, and said polar moiety having one of a 5-membered cyclic carbonate structure and a hydroxyurethane structure, may be used; and the process may further comprise removing the inert liquid from the polymer microparticles in the form of being dispersed in the inert liquid to collect the polymer microparticles in a powder form.

Advantageous Effects of the Invention

According to the present invention, it is possible to readily provide microparticles, which can be designed as desired in composition and have a narrow particle size distribution to make them usable in a wide range of applications. Further, the polyhydroxyurethane microparticles provided by the present invention can furnish a technology which is also useful from the standpoint of resource saving and environmental protection, because they can use a specific cyclic carbonate compound synthesized by using carbon dioxide as a raw material therefor.

MODES FOR CARRYING OUT THE INVENTION

Figure 1:
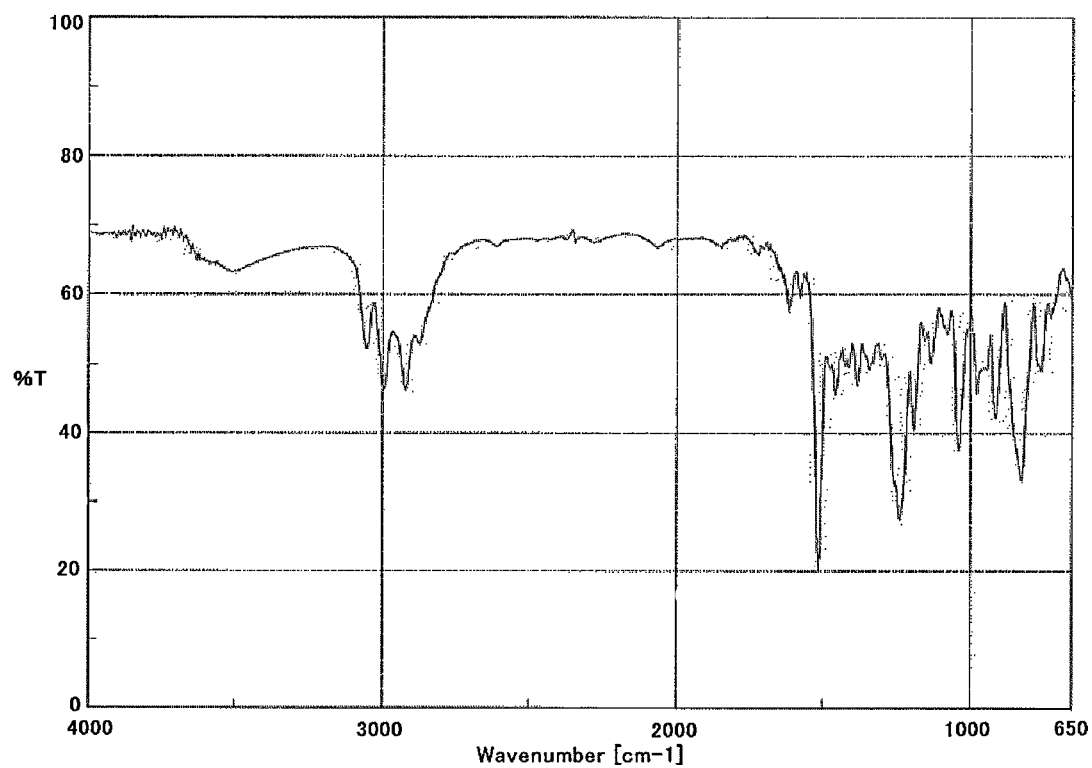
FIG. 1 is a diagram showing an IR spectrum of a raw material, "MY0510", used in Production Example 1.

The present invention will next be described in further detail based on best modes for carrying out the invention.

The polyhydroxyurethane microparticles according to the present invention are spherical polymer microparticles having particle sizes of 0.1 μm to 300 μm, and a polymer that makes up the polymer microparticles has in a structure thereof at least one of two types of chemical structure units represented by the following formulas (1) and (2), and —O—CO— bonds that make up the chemical structure units, respectively, have been derived from carbon dioxide.

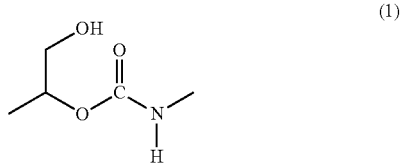

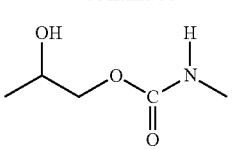

(2)

Described specifically, the polyhydroxyurethane microparticles provided by the present invention are polymer microparticles with carbon dioxide incorporated in their structures. A description will hereinafter be made specifically about individual features. The above-described chemical structure units represented by the formulas (1) and (2), which characterize the present invention, can be formed, for example, by an addition reaction between a 5-membered cyclic carbonate compound and an amine compound. As will be indicated below by equation (A), two products of different structures are known to be obtained in the addition reaction because the cleavage of the 5-membered cyclic carbonate occurs in two ways. As a result, these chemical structure units represented by the formulas (1) and (2) are considered to exist at random in the resulting polymer.

Equation (A)

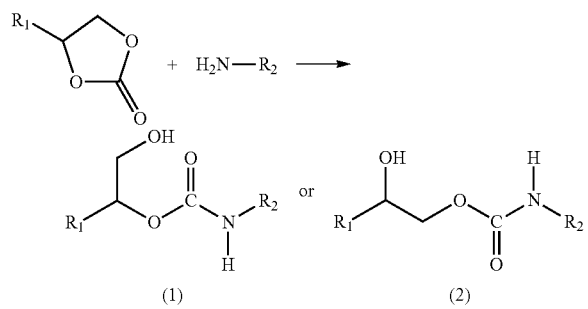

As indicated by the above-described formulas (1) and (2), these chemical structure units have a hydroxyl group close to a urethane bond. Such a structure is not obtainable by a conventional synthesis reaction of a polyurethane, which relies upon the reaction between an isocyanate and hydroxyl groups, and the polyhydroxyurethane microparticles according to the present invention are characterized in that they have a specific structure not found to date. In other words, the polyhydroxyurethane resin that characterizes the present invention can be considered to be a high-molecular material different from the conventional polyurethane resins, although they have a urethane structure. From this structural feature of the resin, the polyhydroxyurethane microparticles according to the present invention also exhibit characteristics different from the conventional polyhydroxyurethane microparticles.

A description will next be made about a process for producing the above-described polyhydroxyurethane microparticles having the novel structure.

The polyhydroxyurethane microparticles according to the present invention can be obtained by using the above-described reaction represented by the equation (A). In a specific production process, a compound having at least two 5-membered cyclic carbonate groups as reactive groups (which may hereinafter be referred simply as "the cyclic carbonate compound") and a compound having at least two amino groups as reactive groups (which may hereinafter be referred simply as "the amine compound") are used as essential reactants, and subsequent to homogeneous dispersion of these compounds in an inert liquid with a dispersant contained therein, the resulting dispersion is heated to react both the compounds to obtain polyhydroxyurethane microparticles in a form of being dispersed in the inert liquid. According to the production process of the present invention, a compound having at least three reactive groups in a molecule may be used as one of the two compounds required essentially in the above-described reaction, and both the compounds may be reacted at an equivalent ratio of functional groups of 0.7 to 1.5.

The term "equivalent ratio of functional groups" as used herein is of a similar concept as the molar equivalent ratio of functional groups, and is calculated by the below-described equation. In the present invention, two or more cyclic carbonate compounds and two or more amine compounds can also be used. As a calculation method of an equivalent ratio of functional groups in such a case, the equivalent ratio of functional groups can be calculated such that in each of the numerator and denominator, the masses of the two or more compounds are added to obtain the total value of the masses of all the compounds and the molecular weights and numbers of functional groups of the two or more compounds are used as weighted averages based on all the compounds. It is to be noted that the term "number of functional groups" in the below-described equation means the number of cyclic carbonate structures or amino groups which the cyclic carbonate compound or amine compound has in a molecule thereof. About a specific calculation method, a description will be made subsequently herein.

$$\text{Equivalent ratio of functional groups} = \frac{\left(\begin{array}{c}\text{mass of the carbonate compound in the composition} \times \\ \text{number of functional groups in the carbonate compound} \div \\ \text{molecular weight of the carbonate compound}\end{array}\right)}{\left(\begin{array}{c}\text{mass of the amine compound in the composition} \times \\ \text{number of functional groups in the amine compound} \div \\ \text{molecular weight of the amine compound}\end{array}\right)}$$

The above-described cyclic carbonate compound that characterizes the present invention may preferably be one obtained by the reaction between an epoxy compound and carbon dioxide, and specifically, can be obtained as will be described below. For example, an epoxy compound as a raw material is reacted in the presence of a catalyst, at a temperature of 0° C. to 160° C., under a carbon dioxide atmosphere pressurized to atmospheric pressure to 1 MPa or so, for 4 to 24 hours. As a result, a cyclic carbonate compound with carbon dioxide fixed at ester moieties thereof can be obtained.

When producing the polyhydroxyurethane microparticles according to the present invention, the reaction ratio of the cyclic carbonate compound to the amine compound may be set, as a basis, such that the carbonate groups and the amino groups in the respective compounds become equivalent in amount, that is, their relative ratio becomes 1.0. When one of the compounds is a compound having three or more functional groups, it is, therefore, preferred to use the other compound in a greater amount if the other compound has two functional groups. However, their relative ratio is not absolutely needed to be 1.0, and microparticles can still be formed even in a state that either the carbonate groups or the amino groups are in excess of the other groups. When the relative ratio of both the compounds is defined to be the equivalent ratio of functional groups mentioned above, the range of equivalent ratio of functional groups, in which the formation of microparticles can be conducted well, is 0.7 to 1.5. As a more preferred usage ratio of both the compounds, the molar equivalent ratio may be set within a range of 0.9 to 1.2. When the cyclic carbonate compound is used in a greater amount, microparticles can be produced with carbon dioxide incorporated in a greater amount. When the amine compound is used in a greater amount, on the other hand, the reaction velocity is accelerated so that the production efficiency is improved.

As the heating temperature upon conducting the reaction, the reaction is feasible in a temperature range of room temperature to 200° C., more preferably in a range of 60 to 120° C. If the reaction temperature is unduly low, the progress of the reaction is slow so that the production efficiency of microparticles may be lowered. Even if the reaction is conducted at a high temperature, on the other hand, no particular reaction problem arises insofar as it is within the above-described range. If the reaction temperature exceeds the boiling point of the below-described inert liquid employed upon production, however, such a high temperature poses a problem for the synthesis so that there is a need to pay attention to the reaction temperature.

The inert liquid employed in the production process according to the present invention is a reaction solvent, and is an organic compound (organic solvent) free of any chemical component that reacts with any one of the 5-membered cyclic carbonate compound and amine compound as essential reactants. As the organic compound, a variety of organic compounds can be used in the present invention. It is, however, an essential condition that neither the cyclic carbonate compound and amine compounds as reactants nor the hydroxyurethane resin available from the reaction of both of them is soluble at all. Insofar as this condition is satisfied, an organic compound can be suitably selected commensurate with the solubility of the monomers to be used. Further, the boiling point of such an organic solvent may preferably be 40° C. or higher because an unduly low boiling point leads to a slow progress of the reaction for the synthesis of microparticles so that their production efficiency is lowered. On the other hand, the employment of an organic solvent of excessively high boiling temperature makes it difficult to remove the organic solvent upon taking out the synthesized resultant microparticles as a powder separated from the organic solvent. It is, therefore, preferred to use one having a boiling point of 220° C. or lower. As inert liquids that satisfy the above-described requirements and are suitably usable in the present invention, illustrative are hydrocarbon solvents such as pentane, hexane, heptane, octane, decane, petroleum ether, petroleum benzine, ligroin, petroleum spirit, cyclohexane, methylcyclohexane and ethylcyclohexane, aromatic solvents such as toluene and xylene, fluorinated solvents, silicone oils, and the like. Two or more of these organic solvents can also be used in combination.

The usage amount of such an inert liquid as described above may be preferably 100 parts by mass or more, with a range of 100 parts by mass or more but 400 parts by mass or less being more preferred, per 100 parts by mass of the total amount of the cyclic carbonate compound and amine compound as essential reactants to be used in the production. A usage amount of less than 100 parts by mass tends to lead to a state that the inert liquid is emulsified in the raw materials, thereby making it difficult to produce microparticles in a good form. In a system that the inert liquid is used in a large amount greater than 400 parts by mass, on the other hand, the production efficiency is lowered. Usage amounts outside the above-described range are not preferred accordingly.

The production of the polyhydroxyurethane microparticles in the present invention can be conducted without particularly using a catalyst. To promote the reaction, however, it can be conducted in the presence of such a catalyst as will be described below. Examples of the catalyst usable in such a case include basic catalysts such as triethylamine, tributylamine, diazabicycloundecene (DBU), triethylenediamine (DABCO) and pyridine, and Lewis acid catalysts such as tetrabutyltin and dibutyltin dilaulate. The preferred usage amount of such a catalyst is 0.01 to 10 parts by mass per the total amount (100 parts by mass) of the cyclic carbonate compound and amine compound to be used.

According to the production process of the present invention, the cyclic carbonate compound and amine compound as reactants are homogeneously dispersed in such an inert liquid as enumerated above with a dispersant contained therein, and the resulting dispersion is then heated to react both the compounds such that polymer microparticles are obtained in a form of being dispersed in the inert liquid. As the dispersant for use in the above-described production, it is possible to use a compound provided in a molecule thereof with a polar moiety and a non-polar moiety, that is, having the chemical structure of a general dispersant. For example, a block oligomer, block polymer, or a polymer or oligomer chemically modified at terminals or side chains thereof may be used preferably.

As the structure of the non-polar moiety in a dispersant suited for the present invention, a chemical structure having strong affinity to the above-mentioned inert liquid is preferred, and an oligomer or polymer having a molecular weight of 500 or higher is preferred to more stabilize emulsified microparticles. For such reasons as described above, as the specific chemical structure of the dispersant suited for the present invention, one having a hydrocarbon skeleton or polysiloxane skeleton can be mentioned. Further, one having a polybutadiene skeleton is particularly preferred in that the emulsified microparticles are narrow in particle size distribution and the resultant microparticles do not agglomerate much when dried and have good redispersibility.

As the structure of the polar moiety in the dispersant, on the other hand, a chemical structure having strong affinity to the cyclic carbonate compound and amine compound as essential reactants is preferred. Therefore, the polar moiety in the dispersant may preferably have, in its structure, a polar functional group such as a hydroxyl, amino, carboxyl or sulfone group, or a polarized chemical bond such as an ether, ester, amide, urethane, urea or carbonate bond. Particularly preferred structures include the same cyclic carbonate structure as the cyclic carbonate compound as an essential reactant for the emulsifying reaction and a structure containing a urethane bond formed through a reaction with the amine compound.

The usage amount of the dispersant in the present invention may be preferably 0.1 to 20 parts by mass, more preferably 0.4 to 5 parts by mass per 100 parts by mass of the total amount of the essential cyclic carbonate compound and amine compound to be used in the reaction. A usage amount of less than 0.1 parts by mass leads to insufficient emulsifiability for the raw materials, results in destruction of emulsified microparticles in the course of the production to promote the formation of agglomerates, and therefore, makes it difficult to obtain microparticles having particle sizes of 0.1 μm to 300 μm, the provision of which is an object of the present invention. Even if the amount of the dispersant is greater than 20 parts by mass, on the other hand, the emulsified microparticles are stable, and no problem arises in producing good microparticles. However, such a usage amount is too much for the purpose of obtaining effects as a dispersant, does not bring about no particular merit but is conversely inferior in economy, and is not preferred.

No particular limitation is imposed on the production equipment usable in the production process according to the present invention. Usable examples include reaction apparatuses equipped with simple stirring devices, respectively, and dispersion apparatuses of higher emulsification capacity, such as homogenizers and jet mills. Of these, the use of a homogenizer is preferred in production efficiency because of a shorter time until the particle sizes of polymer microparticles obtained by emulsification become stable.

As another embodiment, the present invention also provides a production process that the inert liquid (inert organic solvent) is removed from the polymer microparticles produced in the form of being dispersed in the inert liquid as described above and the polymer microparticles are taken out in a powder form. As the polymer microparticles produced by such a process as mentioned above are obtained in the form of being dispersed in the inert organic solvent, a removal step of the inert organic solvent is needed to bring the polymer microparticles into a powder form. In the present invention, the polymer microparticles may be first separated before removing the inert organic solvent. As a separation method useful in this case, a method that relies upon filtration or a method that evaporates the inert organic solvent can be mentioned. As the method that relies upon filtration, filtration can be conducted by an atmospheric, vacuum or pressure filtration method making use of a filter paper or filter cloth made of paper or resin, and any filtration apparatus can be used insofar as it is conventionally known and is commonly used.

From the polymer microparticles collected by filtration, the inert organic solvent is next removed to provide a dry powder. In some cases, however, it may also be effective to remove the inert organic solvent without going through the above-described separation step. As a removal method of the inert organic solvent, a method that evaporates the inert organic solvent under atmospheric pressure or vacuum to conduct drying can be mentioned. As a drying temperature suited for the removal of the inert organic solvent, a preferred range is 40° C. to 80° C. although it is affected by the boiling pressure and vapor pressure of the inert organic solvent and the particle size and thermal softening temperature of the polymer microparticles. Further, it is preferred to conduct the drying under vacuum, specifically under such a pressure that the boiling temperature of the inert organic solvent falls within a range of 40 to 80°. No particular limitation is imposed on an apparatus required for such drying, and known apparatuses can all be used. For example, apparatuses such as a tray dryer, a vacuum dryer and a spray dryer can be mentioned as preferred apparatuses.

As described above, the polyhydroxyurethane microparticles according to the present invention can be obtained from the cyclic carbonate compound and the amine compound. As the cyclic carbonate compound used in this reaction, it is preferred to use one obtained by the reaction between an epoxy compound and carbon dioxide. Described specifically, it is preferred to synthesize the polyhydroxyurethane microparticles of the present invention by using a carbonate compound having two 5-membered cyclic carbonate groups as reactive groups and obtained by such a method as will be described below. For example, an epoxy compound as a raw material is reacted in the presence of a catalyst, at a temperature of 0° C. to 160° C., under a carbon dioxide atmosphere of atmospheric pressure or a pressure elevated to 1 MPa or so, for 4 to 24 hours. As a result, a cyclic carbonate compound with carbon dioxide fixed at ester moieties thereof can be obtained.

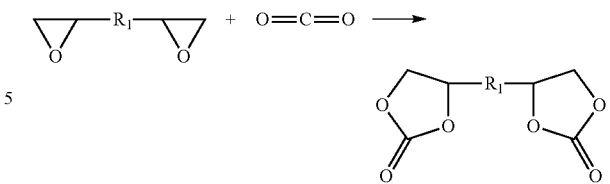

Owing to the use of the cyclic carbonate compound synthesized by using carbon dioxide as a raw material as described above, the resultant polyhydroxyurethane microparticles have chemical structure units represented by the below-described formula (1) and/or chemical structure units represented by the below-described formula (2) in their polymer structure. As a consequence, the —O—CO— bonds in the formulas (1) and (2) are those derived from carbon dioxide.

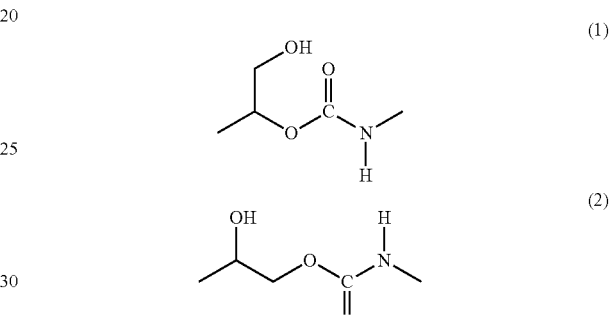

From the standpoint of effective utilization of carbon dioxide, the content of the above-described —O—CO— bonds derived from carbon dioxide (the fixed amount of carbon dioxide) in the polyhydroxyurethane microparticles provided by the present invention may be set preferably as high as possible. In this regard, carbon dioxide can be incorporated in a range of 1 to 30 mass % in the structure of the resulting polyhydroxyurethane resin, for example, when the polymer microparticles are produced using the cyclic carbonate compound synthesized as described above. The polyhydroxyurethane microparticles according to the present invention are a material in which —O—CO— bonds derived from carbon dioxide as a raw material account for 1 to 30 mass % of the mass thereof.

As the catalyst useful in the above-mentioned reaction for obtaining the cyclic carbonate compound from the epoxy compound and carbon dioxide, preferred examples include halides such as lithium chloride, lithium bromide, lithium iodide, sodium chloride, sodium bromide and sodium iodide, and quaternary ammonium salts. Such a catalyst may be used in an amount of 1 to 50 parts by mass, preferably 1 to 20 parts by mass per 100 parts by mass of the epoxy compound as a raw material. Further, triphenylphosphine or the like may also be used at the same time to provide such a salt, that is, such a catalyst with improved solubility.

The above-described reaction between the epoxy compound and carbon dioxide can also be conducted in the presence of an organic solvent. As the organic solvent useful in the reaction, any organic solvent can be used insofar as it dissolves the above-mentioned catalyst. Described specifically, preferred examples of the organic solvent include amide solvents such as N,N-dimethylformamide, dimethyl sulfoxide, dimethylacetamide and N-methyl-2-pyrrolidone, alcohol solvents such as methanol, ethanol, propanol, ethylene glycol and propylene glycol, and ether solvents such as ethylene glycol monomethyl ether, ethylene glycol dimethyl ether, propylene glycol methyl ether, diethylene glycol monomethyl ether, diethylene glycol dimethyl ether and tetrahydrofuran.

As cyclic carbonate compounds usable in the production process according to the present invention and having aliphatic skeletons, respectively, compounds such as those to be illustrated below can be exemplified.

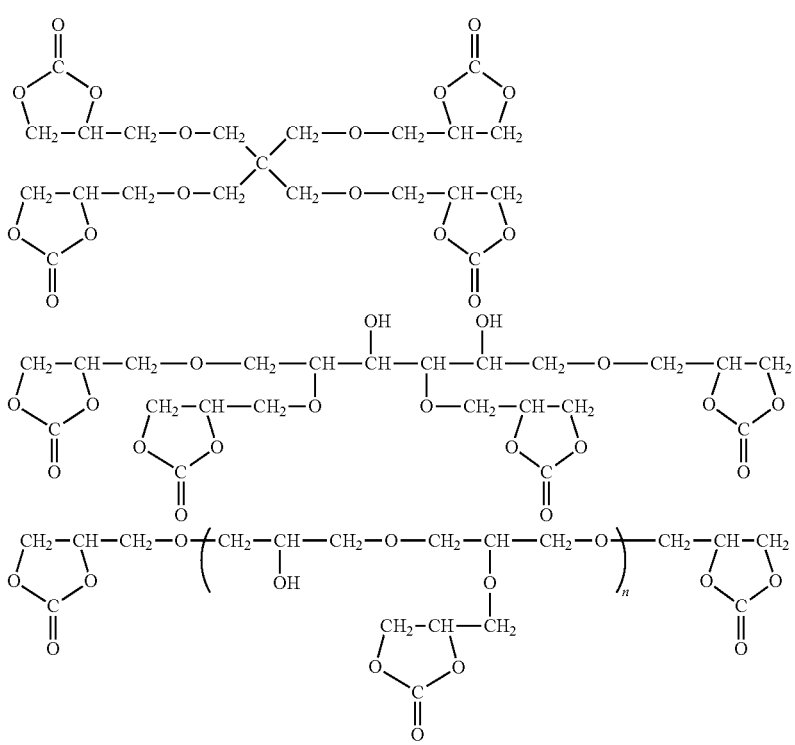

A description will be made about the cyclic carbonate compound for use in the production process according to the present invention. No particular limitation is imposed on the structure of the cyclic carbonate compound, and any cyclic carbonate compound can be used insofar as it contains at least two cyclic carbonate groups in a molecule. More preferably, the use of a compound containing three cyclic carbonate groups or more is industrially advantageous in that the reaction time for the synthesis of the microparticles can be shortened. Cyclic carbonate compounds—each of which has, for example, an aromatic skeleton or an aliphatic, alicyclic or heterocyclic skeleton as a main skeleton of the compound, to which cyclic carbonate groups are bonded—are also usable. As the structure of a linkage between a main skeleton and each associated cyclic carbonate group, the structure of any one of an ether bond, an ester bond and a tertiary amine bond is usable. Compounds usable in the production process according to the present invention will hereinafter be exemplified.

As cyclic carbonate compounds usable in the production process according to the present invention and having aromatic skeletons, respectively, compounds such as those to be illustrated below can be exemplified.

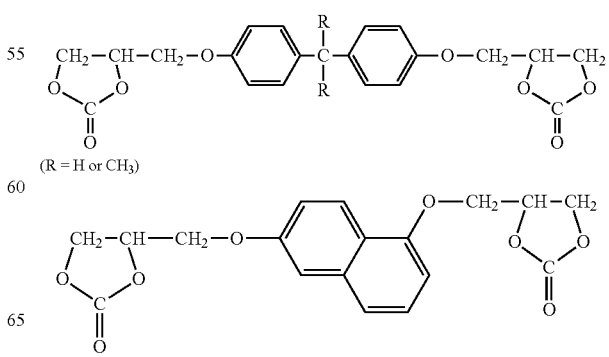

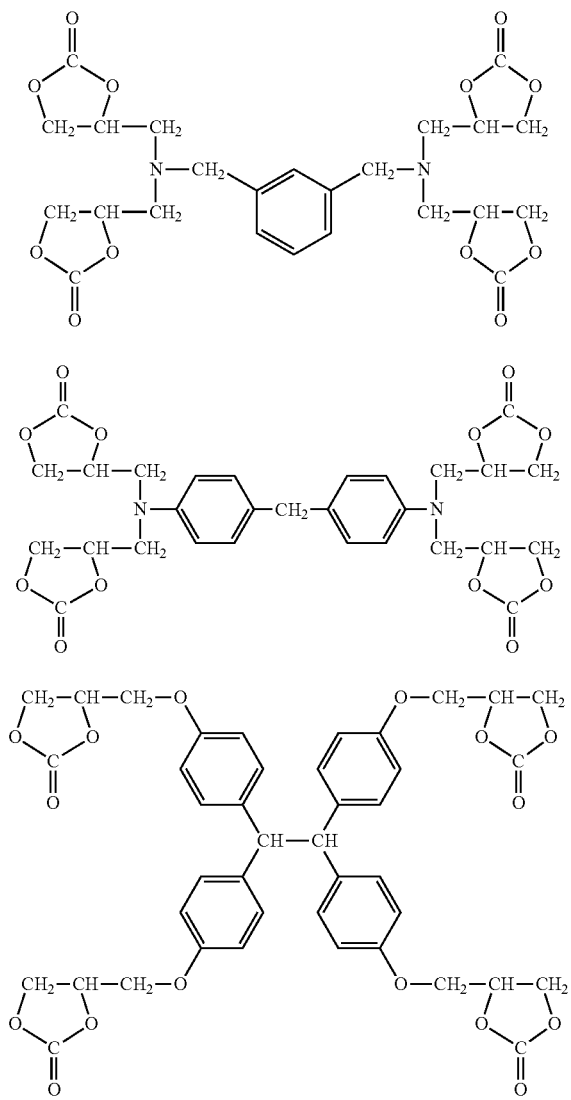
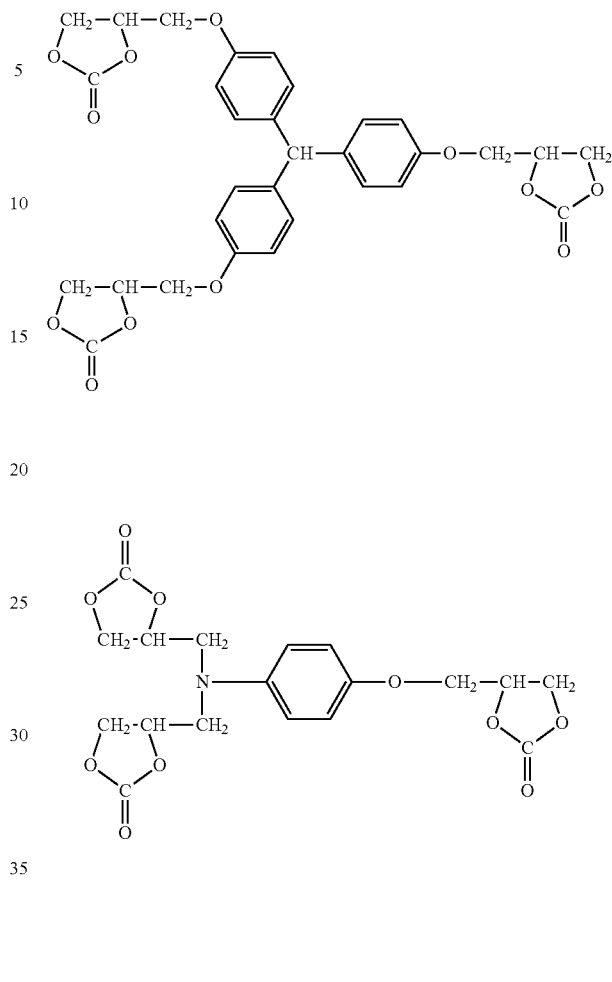
As alicyclic and heterocyclic carbonate compounds usable in the production process according to the present invention, compounds such as those to be illustrated below can be exemplified.
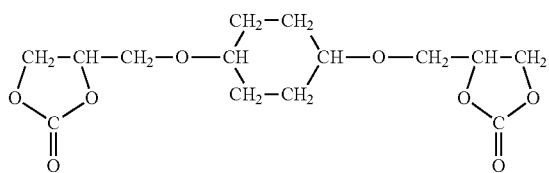
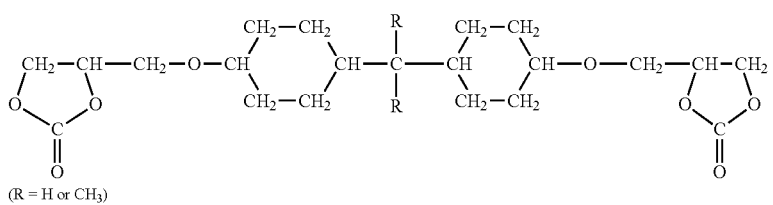
(R = H or CH₃)

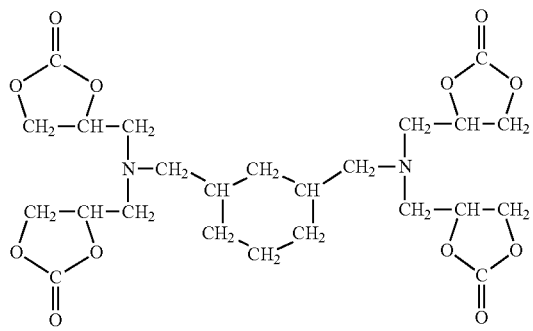
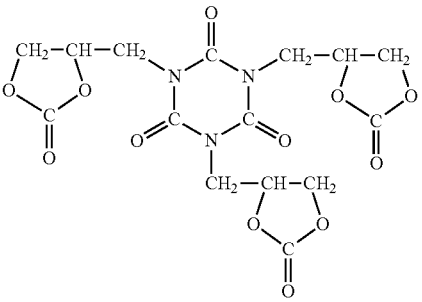

A description will next be made about a polyfunctional amine compound, which is useful in the reaction with such a cyclic carbonate compound as enumerated above in the production process of the present invention for the polyhydroxyurethane resin microparticles and has at least two amino groups as reactive groups. As the compound, conventionally-known polyfunctional amine compounds are all usable. Preferred examples include linear aliphatic polyamines such as ethylenediamine, diethylenetriamine, dipropylenetriamine, triethylenetetramine, tetraethylenepentamine, 1,3-diaminopropane, 1,4-diaminobutane, 1,6-diaminohexane, 1,8-diaminooctane, 1,10-diaminodecane and 1,12-diaminododecane, cyclic aliphatic polyamines such as isophoronediamine, norbornanediamine, 1,6-cyclohexanediamine, piperazine, 2,5-diaminopyridine, 4,4'-diaminodicyclohexylmethane, 1,3-bis(aminomethyl)cyclohexane, aliphaticpolyamines having aromatic rings such as xylenediamine, and aromatic polyamines such as meta-phenylenediamine and diaminodiphenylmethane. Ethylene oxide adducts and propylene oxide adducts of these compounds can also be mentioned as preferred compounds.

In the production process of the present invention for the polyhydroxyurethane microparticles, one or more of various additives such as colorants, e.g., dyes and pigments, plasticizers, anti-oxidants, ultraviolet absorbers, antistatic agents, and abrasives may be mixed in a part or the entire part of such raw material components as described above. The polyhydroxyurethane microparticles can hence be synthesized with one or more of these additives contained therein.

EXAMPLES

The present invention will next be described in further detail based on specific production examples, examples and comparative example. It should, however, be borne in mind that the present invention shall not be limited to these examples. It should also be noted that the designations of "parts" and "%" in the following examples are on a mass basis unless otherwise specifically indicated.

Equivalent Ratio of Functional Groups

The "equivalent ratio of functional groups" of a cyclic carbonate compound to an amine compound used in each of the reactions to be described hereinafter is a value calculated by using the following equation as will be described below.

$$\text{Equivalent ratio of functional groups} = \frac{\begin{pmatrix} \text{mass of the carbonate compound in the composition} \times \\ \text{number of functional groups in the carbonate compound} \div \\ \text{molecular weight of the carbonate compound} \end{pmatrix}}{\begin{pmatrix} \text{mass of the amine compound in the composition} \times \\ \text{number of functional groups in the amine compound} \div \\ \text{molecular weight of the amine compound} \end{pmatrix}}$$

The "number of functional groups in the carbonate compound÷molecular weight of the carbonate compound" needed with respect to the cyclic carbonate compound in the above-described calculation equation is an index that indicates the molar equivalent of carbonate groups per gram of the carbonate compound, and therefore, is defined as "carbonate equivalent" and was actually measured by a measuring method to be described subsequently herein, because a cyclic carbonate compound synthesized from an epoxy compound and carbon dioxide in each example was obtained as a mixture of cyclic carbonate compounds having different numbers of carbonate groups in a molecule. It is to be noted that the amine compound is free of such a problem and the molar equivalent of amino groups can be determined from the molecular weight of the amine compound.

A carbonate compound (1 g), the "carbonate equivalent" of which was to be measured, was dissolved in N,N-dimethylformamide (50 g). A solution (10 mL) of n-hexylamine (molecular weight: 101.19) in toluene, the concentration of which had been adjusted to 1 mol/L, was added, followed by a reaction at 60° C. for 10 hours. After the reaction, the reaction mixture was titrated to neutral with 0.5 N hydrochloric acid to quantify the amount of unreacted n-hexylamine. On the side, a blank titration was conducted without addition of the carbonate compound, and the consumed amount of n-hexylamine was calculated back. The quotient obtained by dividing the consumed amount with the molecular weight of n-hexylamine was employed as the "carbonate equivalent" (unit: eq/g). In other words, the carbonate equivalent can be determined by [the amount of n-hexylamine (g) reacted with one (1) gram of the carbonate compound÷101.19 (unit: eq/g)].

Content of Carbon Dioxide in Compound

As the —O—CO— bonds in the carbonate groups in the carbonate compound used in each example originated from carbon dioxide, the content of carbon dioxide in the carbonate compound can be calculated from the "carbonate equivalent" obtained as described above. Described specifically, the content of carbon dioxide (%) can be determined by [the carbonate equivalent (eq/g)×44 (the molecular weight of $CO_2$)× 100]. In the present invention, each content of carbon dioxide was determined through a calculation in a manner as described above.

Production Example 1

Synthesis of Cyclic Carbonate Compound (A-I)

A p-aminophenol epoxy resin having an epoxy equivalent of 100 (trade name: "MY0510", product of Huntsman Advanced Materials L.L.C.; hereinafter abbreviated as "MY0510"; 100 parts), sodium iodide (product of Wako Pure Chemicals Industries, Ltd.; 20 parts), and N-methyl-2-pyrrolidone (150 parts) were charged in a reaction vessel equipped with a stirrer and an open reflux condenser. Carbon dioxide was next continuously bubbled under stirring at 100° C. for 10 hours to conduct a reaction. Subsequently, the resulting reaction mixture was diluted with ethyl acetate (200 parts). The diluted reaction mixture was transferred to a separation funnel, and then washed four times with brine to remove N-methyl-2-pyrrolidone and sodium iodide. After the washing, an ethyl acetate layer was transferred to an evaporator, and ethyl acetate was removed under reduced pressure. As a result, a clear liquid compound (97 parts) was obtained (yield: 72%).

Figure 2:
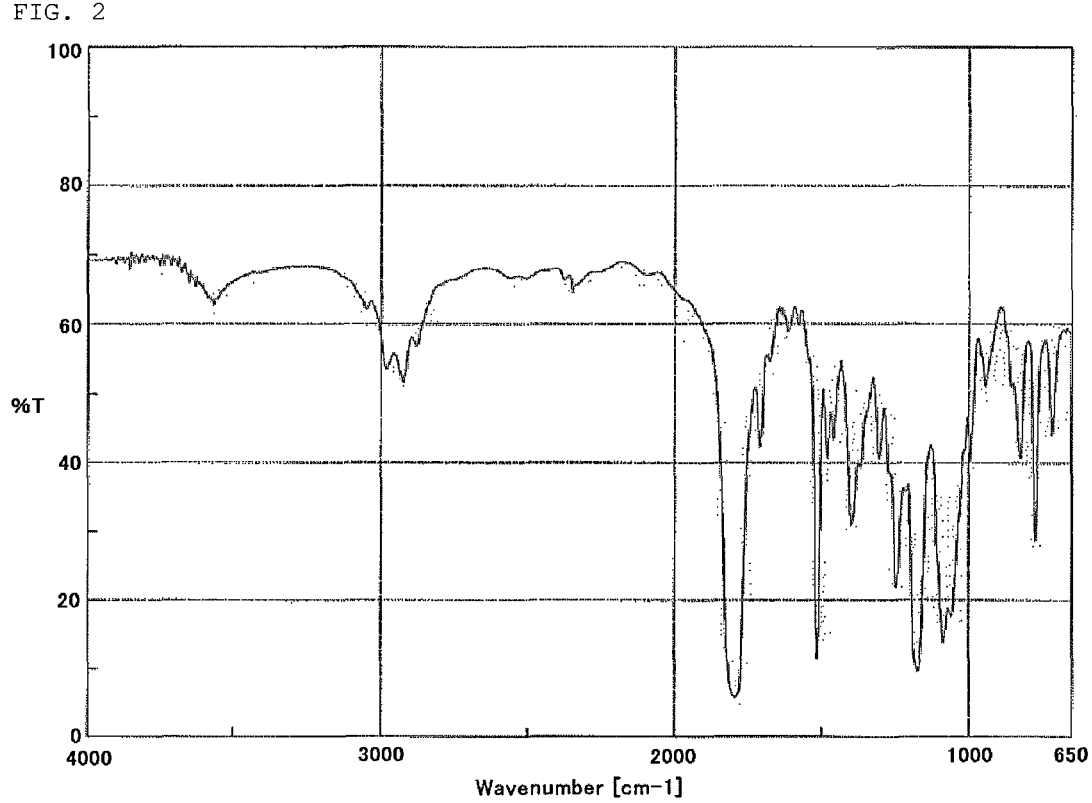
FIG. 2 is a diagram showing an IR spectrum of a substance, in other words, compound A-I obtained in Production Example 1.
Figure 3:
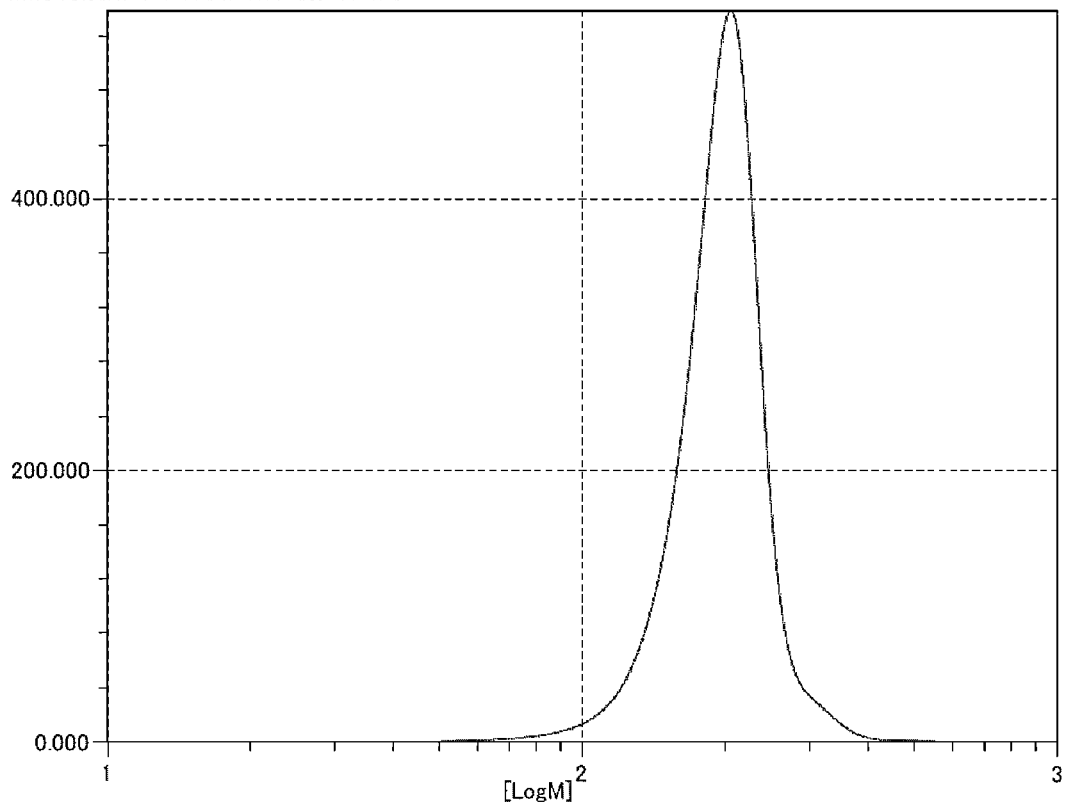
FIG. 3 is a diagram showing a differential molecular weight distribution of the raw material, "MY0510", used in Production Example 1.
Figure 4:
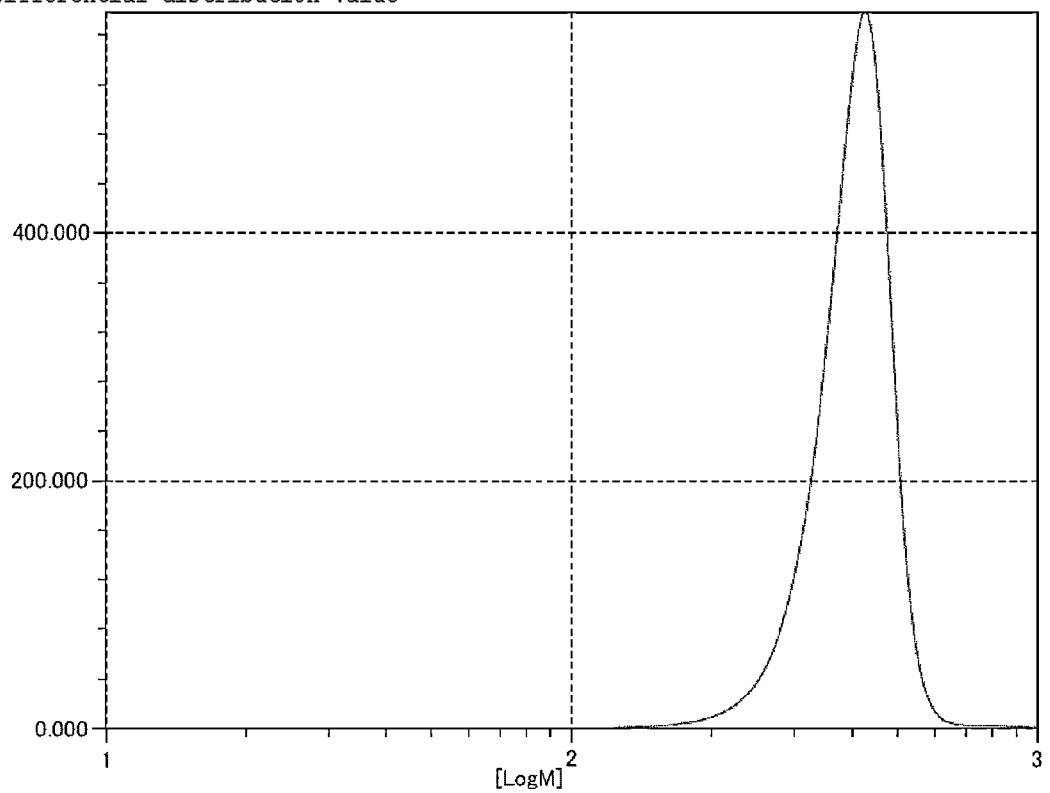
FIG. 4 is a diagram showing a differential molecular weight distribution of the substance obtained in Production Example 1.

When the thus-obtained compound was analyzed by an infrared spectrophotometer ("FT/IR-350", manufactured by JASCO Corporation; this will apply equally to the subsequent production examples; hereinafter abbreviated as "IR"), the peak around 910 $cm^{-1}$ derived from the epoxy groups of the raw material was no longer observed, but instead, a peak derived from the carbonyl groups of carbonate groups which did not exist in the raw material was confirmed around 1,800 $cm^{-1}$. An IR spectrum measured on "MY0510" used as the raw material is shown in FIG. 1, and an IR spectrum measured on the above-obtained substance is shown in FIG. 2. Further, as a result of a measurement by GPC ("GPC-8220" and "Column Super AW2500+AW3000+AW4000+AW5000", manufactured by Tosoh Corporation; this will apply equally to the subsequent production examples and the like) making use of dimethylformamide (hereinafter abbreviated as "DMF") as a mobile phase, the weight average molecular weight of the above-obtained substance was found to be 404 (polyethylene oxide equivalent). A differential molecular weight distribution of "MY0510" used as the raw material is shown in FIG. 3, and a differential molecular weight distribution of the above-obtained substance is shown in FIG. 4.

From the foregoing, the above-obtained substance was confirmed to be a compound, which contained cyclic carbonate groups introduced therein by the reaction between epoxy groups and carbon dioxide and had a structure represented by the below-described formula. This compound will hereinafter be designated as "A-I". Segments derived from carbon dioxide accounted for 30.6% (calculated value) of the compound A-I.

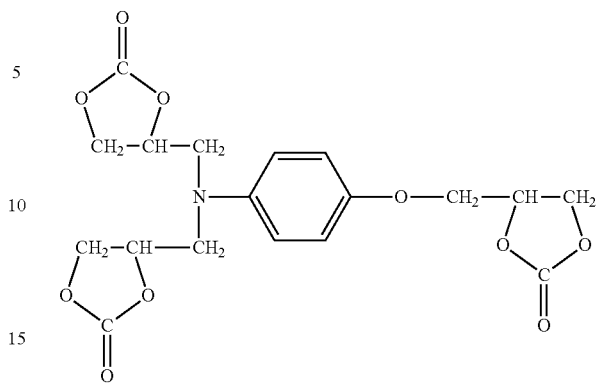

(A-I)

Production Example 2

Synthesis of Cyclic Carbonate Compound (A-II)

Glycerol polyglycidyl ether having an epoxy equivalent of 142 (trade name: "DENACOL EX-313"; product of Nagase Chemtex Corporation; 100 parts), sodium iodide (product of Wako Pure Chemicals Industries, Ltd.; 20 parts), and N-methyl-2-pyrrolidone (150 parts) were charged in a reaction vessel equipped with a stirrer and an open reflux condenser. Carbon dioxide was next continuously bubbled under stirring at 100° C. for 10 hours to conduct a reaction. After completion of the reaction, the solvent was allowed to evaporate by an evaporator to obtain an oily compound (132 parts, yield: 99.9%).

When the thus-obtained compound was analyzed by IR, the peak around 910 $cm^{-1}$ derived from the epoxy groups of the raw material was no longer observed, but instead, a peak derived from the carbonyl groups of carbonate groups which did not exist in the raw material was confirmed around 1,800 $cm^{-1}$. Further, as a result of a measurement by GPC making use of DMF as a mobile phase, the weight average molecular weight of the above-obtained substance was found to be 397 (polyethylene oxide equivalent). From the foregoing, the above-obtained substance was confirmed to be a compound, which contained cyclic carbonate groups introduced therein by the reaction between epoxy groups and carbon dioxide and had a structure represented by the below-described formula. This compound will hereinafter be designated as "A-II". Segments derived from carbon dioxide accounted for 23.7% (calculated value) of the compound A-II.

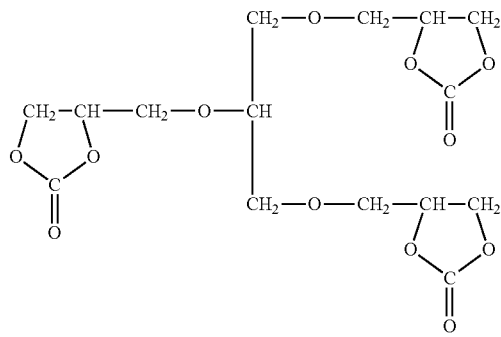

(A-II)

Production Example 3

Synthesis of Cyclic Carbonate Compound (A-III)

Sorbitol polyglycidyl ether having an epoxy equivalent of 165 (trade name: "DENACOL EX-614"; product of NagaseChemtexCorporation; 100 parts), sodium iodide (product of Wako Pure Chemicals Industries, Ltd.; 20 parts), and N-methyl-2-pyrrolidone (150 parts) were charged in a reaction vessel equipped with a stirrer and an open reflux condenser. Carbon dioxide was next continuously bubbled under stirring at 100° C. for 10 hours to conduct a reaction. After completion of the reaction, the solvent was allowed to evaporate by an evaporator to obtain an oily compound (130 parts, yield: 99.5%).

When the thus-obtained compound was analyzed by IR, the peak around 910 cm$^{-1}$ derived from the epoxy groups of the raw material was no longer observed, but instead, a peak derived from the carbonyl groups of carbonate groups which did not exist in the raw material was confirmed around 1,800 cm$^{-1}$. Further, as a result of a measurement by GPC making use of DMF as a mobile phase, the weight average molecular weight of the above-obtained substance was found to be 880 (polyethylene oxide equivalent). From the foregoing, the above-obtained substance was confirmed to be a compound, which contained cyclic carbonate groups introduced therein by the reaction between epoxy groups and carbon dioxide and had a structure represented by the below-described formula. This compound will hereinafter be designated as "A-III". Segments derived from carbon dioxide accounted for 21.1% (calculated value) of the compound A-III.

derived from the carbonyl groups of carbonate groups which did not exist in the raw material was confirmed around 1,800 cm$^{-1}$. Further, as a result of a measurement by GPC making use of DMF as a mobile phase, the weight average molecular weight of the above-obtained substance was found to be 594 (polyethylene oxide equivalent). From the foregoing, the above-obtained substance was confirmed to be a compound, which contained cyclic carbonate groups introduced therein by the reaction between epoxy groups and carbon dioxide and had a structure represented by the below-described formula. This compound will hereinafter be designated as "A-IV". Segments derived from carbon dioxide accounted for 32.8% (calculated value) of the compound A-IV.

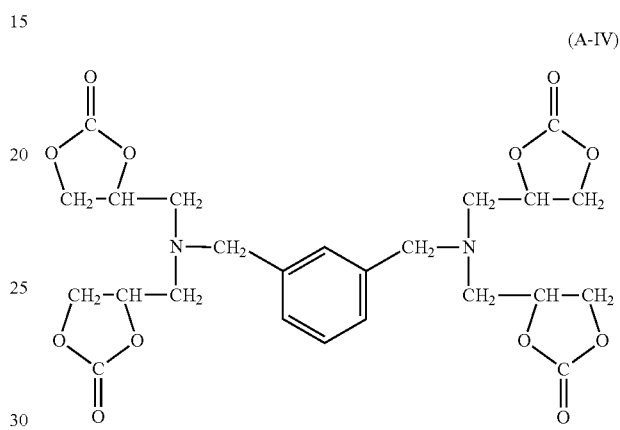

(A-IV)

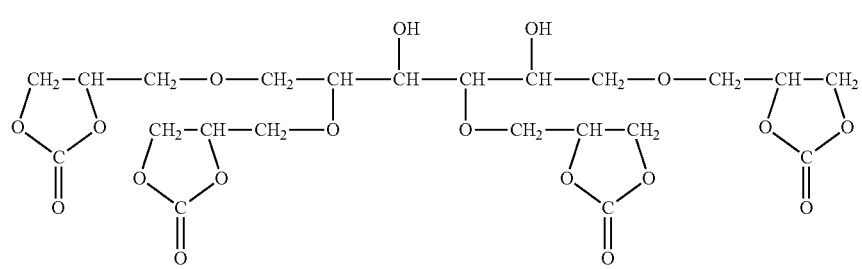

(A-III)

Production Example 4

Synthesis of Cyclic Carbonate Compound (A-IV)

Tetraglycidylxylenediamine having an epoxy equivalent of 90 (trade name: "TETRAD-X"; product of Mitsubishi Gas Chemical Company, Inc.; 100 parts), sodium iodide (product of Wako Pure Chemicals Industries, Ltd.; 20 parts), and N-methyl-2-pyrrolidone (150 parts) were charged in a reaction vessel equipped with a stirrer and an open reflux condenser. Carbon dioxide was next continuously bubbled under stirring at 100° C. for 10 hours to conduct a reaction. After completion of the reaction, methyl ethyl ketone (hereinafter abbreviated as "MEK"; 166 parts) and toluene (83 parts) were added as solvents to the reaction mixture, and an organic layer was taken out. The organic layer so taken out was transferred to a separation funnel, and then washed four times with brine to remove the catalyst. Further, the solvents were then allowed to evaporate by an evaporator to obtain an oily compound (125 parts, yield: 84%).

When the thus-obtained compound was analyzed by IR, the peak around 910 cm$^{-1}$ derived from the epoxy groups of the raw material was no longer observed, but instead, a peak

[Synthesis of a Dispersion Stabilizer Provided in a Molecule Thereof with Polar Moiety and Non-Polar Moiety]

Synthesis Example 1

A terminal diglycidyl ether having a polybutadiene skeleton and an epoxy equivalent of 1571 (trade name: "R45EPT", product of Nagase Chemtex Corporation; 100 parts), sodium iodide (product of Wako Pure Chemicals Industries, Ltd.; 20 parts), and N-methyl-2-pyrrolidone (100 parts) were charged in a reaction vessel equipped with a stirrer and an open reflux condenser. Carbon dioxide was continuously bubbled under stirring at 100° C. for 10 hours to conduct a reaction. After the reaction, the reaction mixture was poured into distilled water (1,000 mL), and a separated oily compound was collected. By a similar analysis as in Production Example 1, the oily compound was confirmed to be a terminal cyclic carbonate compound having a polybutadiene skeleton.

The thus-obtained oily compound (100 parts) and metaxylenediamine (4.2 parts, 0.5 equivalent relative to the compound) were charged in a reaction vessel equipped with a reflux condenser, followed by a reaction at 80° C. for 12 hours to obtain a dispersion stabilizer to be used in examples. The thus-obtained dispersion stabilizer had a structure including, as a non-polar moiety, a polybutadiene skeleton and also including, as polar moieties, a hydroxyurethane bond formed through a reaction between a cyclic carbonate group and an amino group and an unreacted cyclic carbonate group at a terminal of the molecule thereof.

[Production of Polyhydroxyurethane Microparticles]

Example 1

To a stainless steel vessel, the dispersant (5.0 parts) obtained in Synthesis Example 1 and isononane ("KYOWA SOL C-900", trade name, product of Kyowa Hakko Chemical Co., Ltd., this will apply equally to the subsequent examples; 150 parts) were added beforehand to prepare a mixed solution. The cyclic carbonate compound (A-I) (100 parts) obtained in Production Example 1 and meta-xylenediamine (product of Mitsubishi Gas Chemical Company, Inc., will be abbreviated as "MXDA" in a table; 44.9 parts) were gradually added to the mixed solution prepared beforehand, followed by emulsification for 15 minutes in a homogenizer. The resulting emulsion was a stable emulsion without separation, in which a dispersoid had an average dispersed particle size of 5.0 μm. It is to be noted that in the foregoing, the cyclic carbonate compound and amino compound were added to give an equivalent ratio of functional groups of 1.05.

Figure 5:
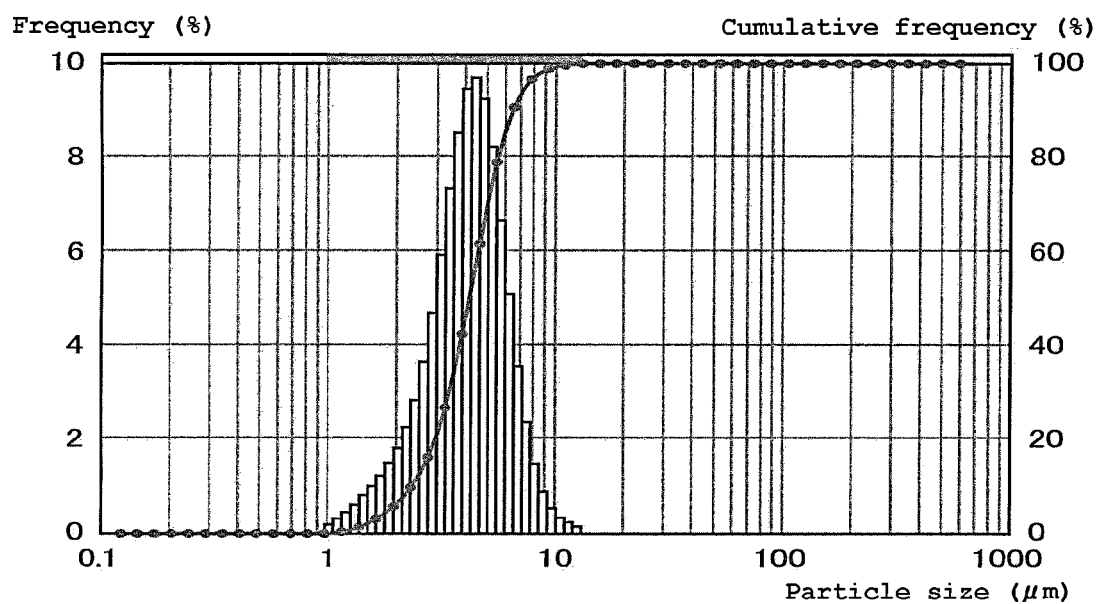
FIG. 5 is a chart diagram showing a particle size distribution of polyhydroxyurethane microparticles (1) obtained in Example 1.
Figure 6:
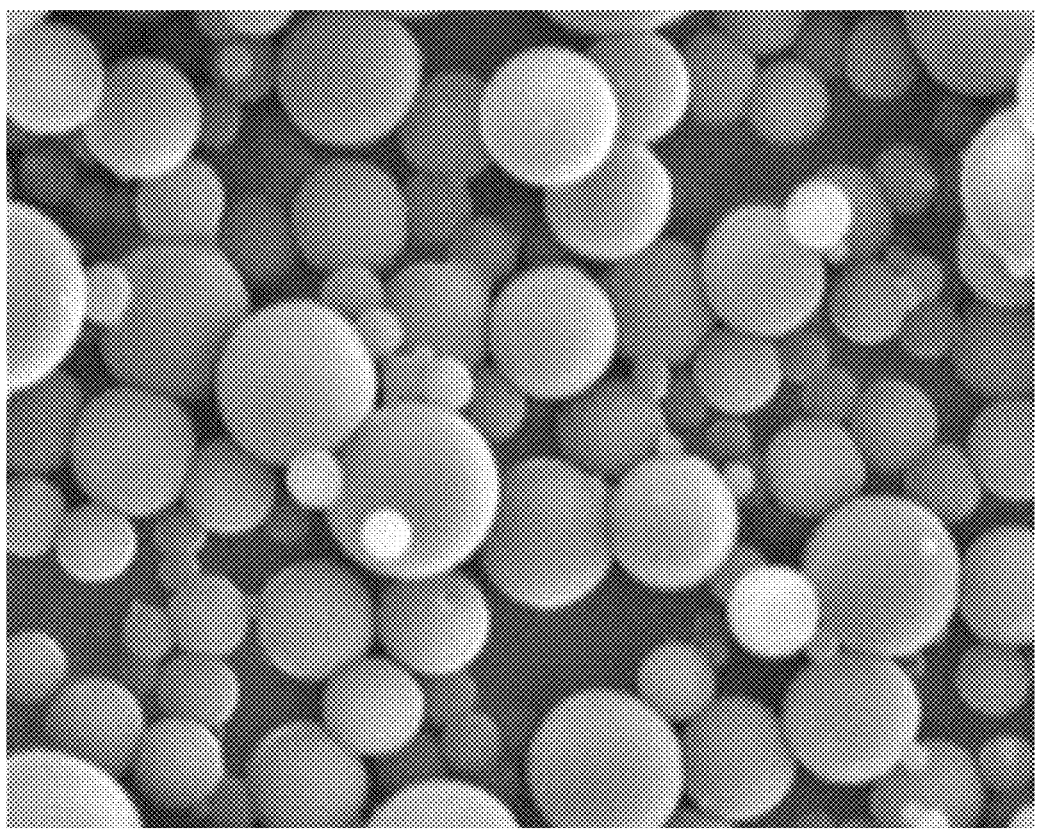
FIG. 6 is an electron micrograph of the polyhydroxyurethane microparticles (1) obtained in Example 1.

The emulsion was next charged in a reaction vessel equipped with a stirrer, followed by a reaction at 80° C. for 6 hours to obtain a dispersion of microparticles. On the thus-obtained dispersion of microparticles, a measurement was conducted using a particle size analyzer ("Microtrac X100", manufactured by Nikkiso Co., Ltd., this will equally apply to the subsequent examples). As a result, the average particle size was found to be 5.0 μm. A particle size distribution chart is shown in FIG. 5. The dispersion was subjected to vacuum drying at 100 Torr to separate isononane, whereby polyhydroxyurethane microparticles (1) were obtained. The thus-obtained microparticles (1) were observed under a scanning electron microscope ("JSM-5510LV", trade name, manufactured by JEOL Ltd., this will apply equally to the subsequent production examples). As a result, the microparticles were found to be in the form of a truly spherical, white powder. An electron micrograph of the thus-obtained polyhydroxyurethane microparticles is shown in FIG. 6. Further, segments derived from carbon dioxide accounted for 21.1% (calculated value) of the microparticles.

Example 2

Polyhydroxyurethane microparticles (2) were obtained as in Example 1 except that the cyclic carbonate compound (A-II) (100 parts) and obtained in Production Example 2 and meta-xylenediamine (29.6 parts) were used. The thus-obtained microparticles were in the form of a truly spherical, white powder having an average particle size of 5.1 μm. Further, segments derived from carbon dioxide accounted for 18.3% (calculated value) of the microparticles. It is to be noted that in the foregoing, the cyclic carbonate compound and the amine compound were added to give an equivalent ratio of functional groups of 1.24.

Example 3

To a stainless steel vessel, the dispersant (2.0 parts) obtained in Synthesis Example 1 and isononane (150 parts) were added beforehand to prepare a mixed solution. The cyclic carbonate compound (A-II) (100 parts) obtained in Production Example 2 and hexamethylenediamine (product of Asahi Kasei Corporation, will be abbreviated as "HMDA" in the table; 34.7 parts) were gradually added to the mixed solution prepared beforehand as described above, and as in Example 1, polyhydroxyurethane microparticles (3) were obtained. The thus-obtained microparticles (3) were in the form of a truly spherical, white powder having an average particle size of 10.5 μm. Further, segments derived from carbon dioxide accounted for 17.6% (calculated value) of the microparticles. It is to be noted that in the foregoing, the cyclic carbonate compound and the amine compound were added to give an equivalent ratio of functional groups of 0.90.

Example 4

To a stainless steel vessel, the dispersant (4.0 parts) obtained in Synthesis Example 1 and isononane (150 parts) were added beforehand to prepare a mixed solution. The cyclic carbonate compound (A-III) (100 parts) obtained in Production Example 3 and meta-xylenediamine (30.9 parts) were gradually added to the mixed solution prepared as described above, and as in Example 1, polyhydroxyurethane microparticles (4) were obtained. The thus-obtained microparticles (4) were in the form of a truly spherical, white powder having an average particle size of 7.2 μm. Further, segments derived from carbon dioxide accounted for 16.1% (calculated value) of the microparticles. It is to be noted that in the foregoing, the cyclic carbonate compound and the amine compound were added to give an equivalent ratio of functional groups of 1.06.

Example 5

To a stainless steel vessel, the dispersant (3.0 parts) obtained in Synthesis Example 1 and isononane (150 parts) were added beforehand to prepare a mixed solution. The cyclic carbonate compound (A-IV) (100 parts) obtained in Production Example 4 and meta-xylenediamine (48.2 parts) were gradually added to the mixed solution prepared as described above, and as in Example 1, polyhydroxyurethane microparticles (5) were obtained. The thus-obtained microparticles (5) were in the form of a truly spherical, white powder having an average particle size of 8.1 μm. Further, segments derived from carbon dioxide accounted for 22.1% (calculated value) of the microparticles (5). It is to be noted that in the foregoing, the cyclic carbonate compound and the amine compound were added to give an equivalent ratio of functional groups of 1.05.

Example 6

To a stainless steel vessel, the dispersant (5.0 parts) obtained in Synthesis Example 1 and isononane (150 parts) were added beforehand to prepare a mixed solution. The cyclic carbonate compound (A-I) (50 parts) obtained in Production Example 1, the cyclic carbonate compound (A-II) (50 parts) obtained in Production Example 2 and hexamethylenediamine (34.0 parts) were gradually added to the mixed solution prepared as described above, and as in Example 1, polyhydroxyurethane microparticles (6) were obtained. The thus-obtained microparticles (6) were in the form of a truly spherical, white powder having an average particle size of 5.0 μm. Further, segments derived from carbon dioxide accounted for 20.3% (calculated value) of the microparticles. It is to be noted that in the foregoing, the cyclic carbonate compound and the amine compound were added to give an equivalent ratio of functional groups of 1.05.

TABLE 1

Compositions of Polyhydroxyurethane Microparticles of Examples

Unit (parts)

| | | Cyclic carbonate compound | | Amine | | Dispersant |
|---|---|---|---|---|---|---|
| Ex. 1 | Kind | A-I | | MXDA | | Dispersant (1) |
| | Usage amount | 100 | | 44.9 | | 5.0 |
| Ex. 2 | Kind | A-II | | MXDA | | Dispersant (1) |
| | Usage amount | 100 | | 29.6 | | 5.0 |
| Ex. 3 | Kind | A-II | | HMDA | | Dispersant (1) |
| | Usage amount | 100 | | 34.7 | | 2.0 |
| Ex. 4 | Kind | A-III | | MXDA | | Dispersant (1) |
| | Usage amount | 100 | | 30.9 | | 4.0 |
| Ex. 5 | Kind | A-IV | | MXDA | | Dispersant (1) |
| | Usage amount | 100 | | 48.2 | | 3.0 |
| Ex. 6 | Kind | A-I | A-II | HMDA | | Dispersant (1) |
| | Usage amount | 50 | 50 | 34.0 | | 5.0 |

MXDA: meta-xylenediamine
HMDA: hexamethylenediamine

Evaluation

With respect to the microparticles (1) to (6) obtained in the above-described Examples 1 to 6, and as a comparative example, existing urethane microparticles ("DYNAMIC BEADS UCN-5070", trade name, average particle size: 7.0 μm, product of Dainichiseika Color & Chemicals Mfg. Co., Ltd.), their performance were evaluated by the following methods and ranking standards. The evaluation results are summarized in Table 2.

[Particle Size]

Using the polymer microparticle dispersions obtained in the examples and comparative example, their respective particle sizes were measured by a particle size analyzer ("Microtrac X100", manufactured by Nikkiso Co., Ltd.) while using isononane as a measurement solvent.

[Degree of Roundness]

With respect to the microparticles of the examples and comparative example, the degrees of their roundness were measured using a particle shape image analyzer ("PITA-1", trade name, manufactured by Seishin Enterprise Co., Ltd.), and were ranked based on the measurement values. The measurement principle consists of measuring the perimeter of a projected microparticle image and calculating the degree of roundness of the microparticle according to the below-described equation. It is to be noted that the degree of roundness is 1 for true roundness and that its value becomes smaller as the shape becomes more complex.

$$\text{Degree of roundness} = \frac{\text{perimeter of circle as determined from equivalent circle diameter}}{\text{perimeter of projected microparticle image}}$$

[Solvent Resistance]

Portions (10 parts, each) of the microparticles of each of the examples and comparative examples were added to the below-described four kinds of organic solvents (90 parts, each), respectively. Subsequent to stirring at room temperature for 3 hours, the organic solvents were filtered off to collect the microparticles. After the collected microparticles were subjected to vacuum drying, their weight reduction rates after the test were measured and ranked according to the below-described standards. As the testing solvents, four kinds of testing solvents, specifically MEK, DMF, toluene (TOL) and isopropyl alcohol (IPA) were used.

A: the weight reduction rate was less than 10% in each solvent.
B: the weight reduction rate was 10% or more but less than 20% in one or more of the solvents.
C: the weight reduction rate was 20% or more in one or more of the solvents.

[Redispersibility]

Twenty (20) parts of the microparticles of each of the examples and comparative example were sampled and added to MEK (80 parts). The thus-obtained mixture was stirred for 60 seconds in a disper mixer. Conditions of the resulting dispersion were observed with the naked eye and under an electron microscope, and were ranked according to the following standards.

5: fully dispersed.
4: substantially dispersed, but coarse particles were included a little.
3: some coarse particles were included.
2: paste as a whole.
1: gelled and settled.

[Heat Resistance]

A weight reduction was measured by TG-DTA after heated at 250° C. for 30 minutes.

A: the weight reduction rate was less than 5%.
B: the weight reduction rate was 5% or more but less than 10%.
C: the weight reduction rate was 10% or more.

[Content of Carbon Dioxide]

The content of carbon dioxide was determined by calculating the mass % of segments, which had been derived from carbon dioxide as a raw material, in the chemical structure of the microparticles of each of the examples and comparative example. Described specifically, the contents of carbon dioxide were indicated by values as calculated from the theoretical amounts of carbon dioxide contained in the monomers used upon synthesis of the compounds (A-I) to (A-IV) which were in turn used in the synthesis reactions of the respective polyhydroxyurethane microparticles. In the case of Example 1, for example, the segments derived from carbon dioxide accounted for 30.6% of the used compound (A-I). Therefore, the content of carbon dioxide in the polyhydroxyurethane microparticles of Example 1 was (100 parts×30.6%)/total amount, i.e., 144.9 parts=21.1 mass %.

TABLE 2

Evaluation Results

| | | Particle size (μm) | Degree of roundness | Solvent resistance | Redispersibility | Heat resistance | Content of carbon dioxide (%) |
|---|---|---|---|---|---|---|---|
| Ex. 1 | Microparticles (1) | 5.0 | 0.96 | A | 5 | A | 21.1 |
| Ex. 2 | Microparticles (2) | 5.1 | 0.94 | A | 5 | A | 18.3 |

TABLE 2-continued

Evaluation Results

|  |  | Particle size (μm) | Degree of roundness | Solvent resistance | Redispers-ibility | Heat resistance | Content of carbon dioxide (%) |
|---|---|---|---|---|---|---|---|
| Ex. 3 | Microparticles (3) | 10.5 | 0.94 | A | 5 | A | 17.6 |
| Ex. 4 | Microparticles (4) | 7.2 | 0.96 | A | 5 | A | 16.1 |
| Ex. 5 | Microparticles (5) | 8.1 | 0.95 | A | 5 | A | 22.1 |
| Ex. 6 | Microparticles (6) | 10.0 | 0.94 | A | 5 | A | 20.3 |
| Comp. Ex. | Polyurethane microparticles "UCN-5070" | 7.0 | 0.95 | A | 5 | A | 0 |

As is evident from the results of Table 2, the polyhydroxyurethane microparticles according to the present invention showed equal shape and physical properties compared with the existing polyurethane microparticles. This indicates that polyhydroxyurethane microparticles to be provided by the present invention can replace the conventional polyurethane microparticles. Further, the production of polyhydroxyurethane particles has never been reported before, and the production process according to the present invention has been found to be useful as a process for the production of the novel polyhydroxyurethane microparticles. Moreover, the polyhydroxyurethane microparticles according to the present invention have also been proven, owing to the fixing of carbon dioxide as parts of their chemical structure at high concentration, to be industrially useful as polyurethane microparticles that different from the existing polyurethane microparticles, enable to provide conventionally-unavailable products responsive to environmental problems.

INDUSTRIAL APPLICABILITY

According to the present invention as described above, the use of the cyclic carbonate compound and amine compound as raw material, and especially preferably, the use of the compound, which has a polar moiety and a non-polar moiety in the structure of a molecule thereof, as a dispersant have provided a production process capable of effectively obtaining polyhydroxyurethane microparticles which have not been available with any conventional technology, are different in structure from the conventional polyurethane microparticles, and are controlled in particle size. Further, the polyhydroxyurethane microparticles provided by the present invention have similar properties as the existing polyurethane microparticles, such as being truly spherical and being extremely readily redispersible in various solvents, and therefore, can be expected to find utility in similar applications as the existing polyurethane microparticles. In particular, the polyhydroxyurethane microparticles provided by the present invention are considered to develop a technology which is also expected to find industrial applications from the viewpoint of global environmental protection in that carbon dioxide can be used as a synthesis raw material for their polymer.

The invention claimed is:

1. Polyhydroxyurethane microparticles,
   wherein the polyhydroxyurethane microparticles are spherical polymer microparticles having a particle size in a range from 1 μm to 300 μm,
   a polymer that forms the polymer microparticles is a product of an addition reaction between a first compound having at least three 5-membered cyclic carbonate groups as reactive groups and a second compound having at least two amino groups as reactive groups,
   in a process of the addition reaction, both the first compound and the second compound are present at an equivalent ratio of functional groups in a range from 0.7 to 1.5 as defined by a following equation:

the equivalent ratio of functional groups =(mass of the first compound in a composition×a number of the carbonate groups in the first compound/molecular weight of the first compound)/ (mass of the second compound in the composition×a number of amino groups in the second compound/molecular weight of the second compound)

where the number of the carbonate groups as the functional groups in the first compound means a number of cyclic carbonate structures that the first compound has in a molecule thereof, and the number of the amino groups as the functional groups in the second compound means the number of amino groups that the second compound has in a molecule thereof, and
   the polymer comprises therein at least one chemical structure unit selected from the group consisting of a unit of formula (1) and a unit of formula (2), and
   —O—CO— bonds present in the chemical structure unit of the formula (1) and the chemical structure unit of the formula (2), respectively, are derived from carbon dioxide

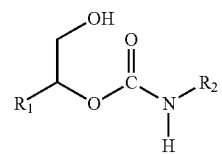
(1)

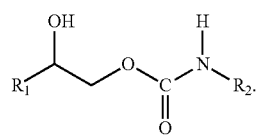
(2)

2. The polyhydroxyurethane microparticles according to claim 1,
   wherein the —O—CO— bonds present in the chemical structure unit of the formula (1) and the chemical structure unit of the formula (2), respectively, each are derived from, as the reactive group, the 5-membered cyclic carbonate group of the first compound that incorporates carbon dioxide as one of raw materials, and
   the —O—CO— bonds derived from carbon dioxide are contained in an amount range from 1 to 30 mass % in the polymer that forms the polymer microparticles.

3. The polyhydroxyurethane microparticles according to claim 1, wherein, the first compound is at least one compound selected from the group consisting of
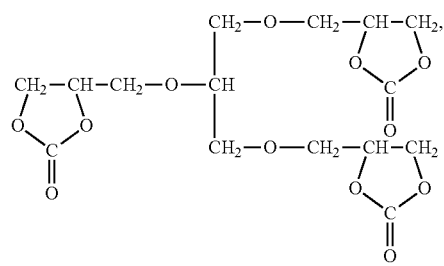
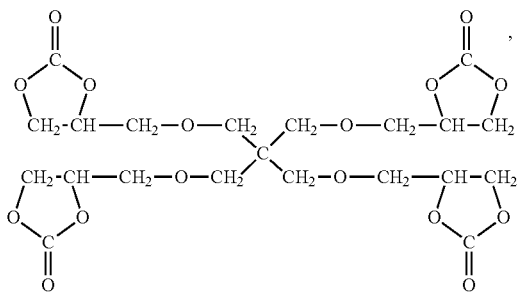
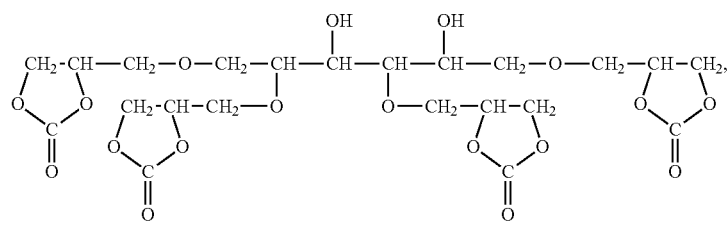
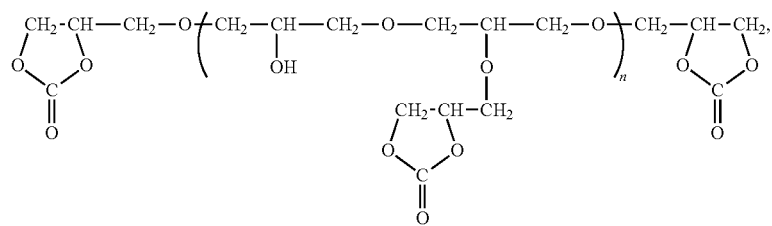
where n is in a range from one to five,
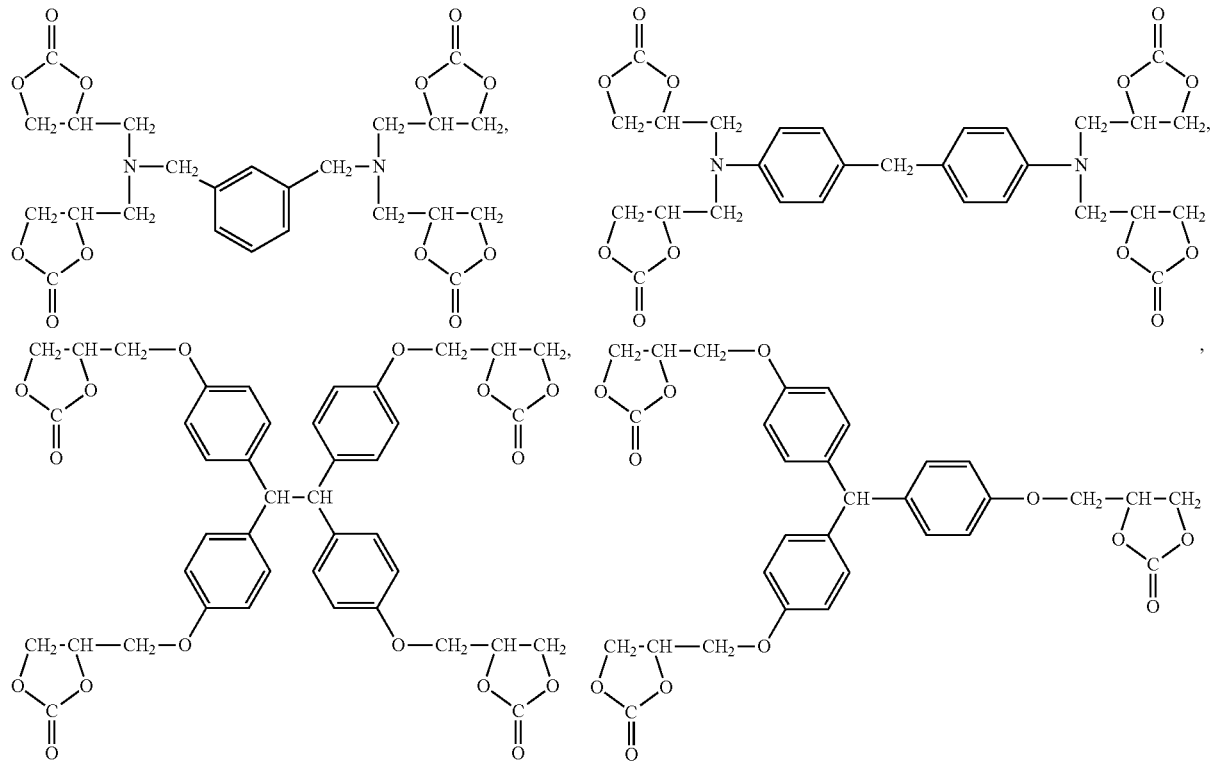

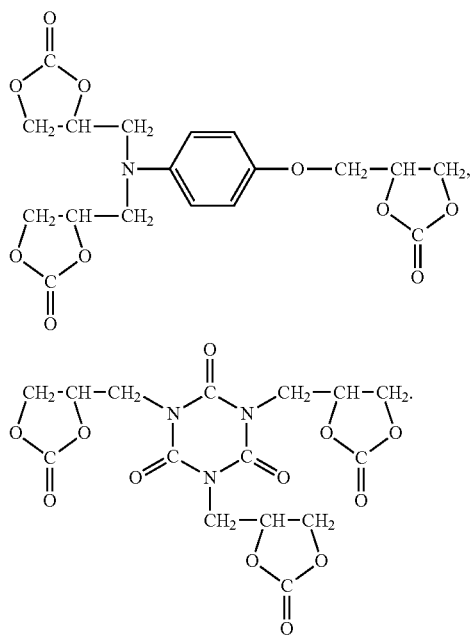
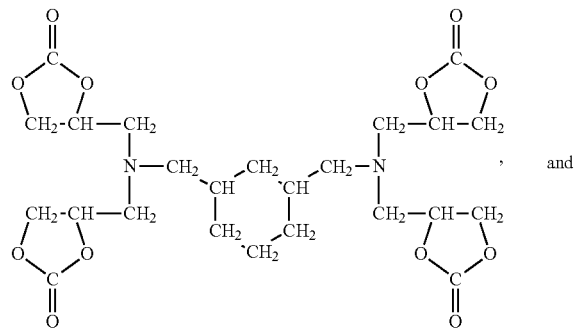
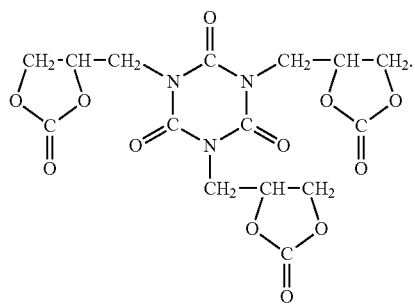

4. The polyhydroxyurethane microparticle according to claim 1,
wherein the polyhydroxyurethane microparticles are in a powder form.

5. The polyhydroxyurethane microparticles according to claim 1,
wherein the polyhydroxyurethane microparticles have a degree of roundness of no lower than 0.94,
wherein the degree of roundness is obtained by a following formulae:

the degree of roundness=a perimeter of a circle as determined from an equivalent circle diameter/a perimeter of a projected microparticle image, where the projected microparticle image is obtained with a particle shape image analyzer.

6. A process for producing the polyhydroxyurethane microparticles according to claim 1, comprising:
forming the polymer microparticles being dispersed in an inert liquid by reacting the first compound that has at least three 5-membered cyclic carbonate groups as reactive groups with the second compound that has at least two amino groups as reactive groups, homogeneously dispersing these compounds in the inert liquid with a dispersant contained therein, and then heating the resulting dispersion,
wherein the reaction between the first compound and the second compound is the adding reaction,
in the reacting process, both the first and second compounds are present at an equivalent ratio of functional groups, as defined by a following equation, in a range from 0.7 to 1.5.

7. The process according to claim 6,
wherein the first compound having the 5-membered cyclic carbonate groups as the reactive groups has been synthesized using carbon dioxide as one of raw materials, and
the —O—CO— bonds are derived from carbon dioxide, and
the carbon dioxide is contained in an amount range from 1 to 30 mass % in the polymer obtained using the first compound in the reaction.

8. The process according to claim 6,
wherein as the dispersant, a compound that has a non-polar moiety and a polar moiety in a structure thereof is used, wherein said non-polar moiety has a polybutadiene skeleton, and said polar moiety has a 5-membered cyclic carbonate structure or a hydroxyurethane structure.

9. The process according to claim 6, further comprising removing the inert liquid from the polymer microparticles being dispersed in the inert liquid so that the polymer microparticles in a powder form are collected.

10. The process according to claim 6,
wherein, the first compound is at least one compound selected from the group consisting of

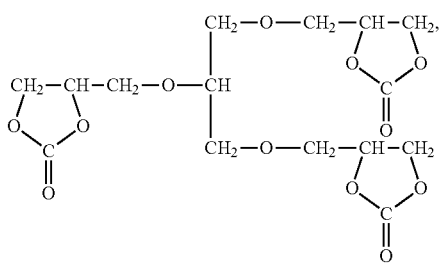
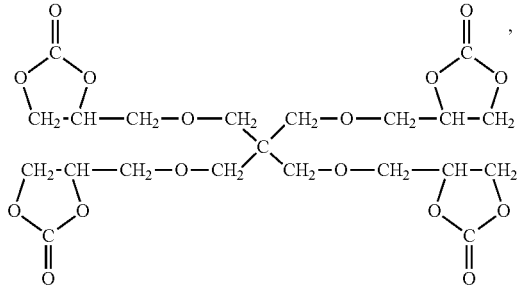

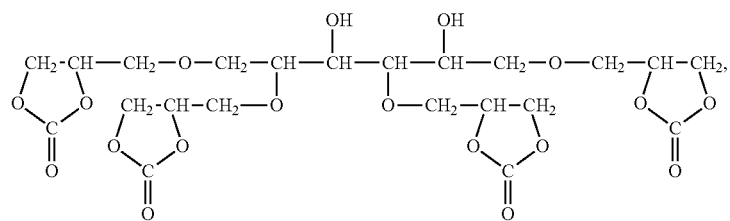
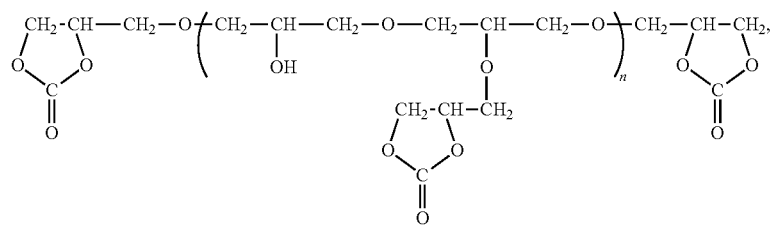
where n is in a range from one to five,
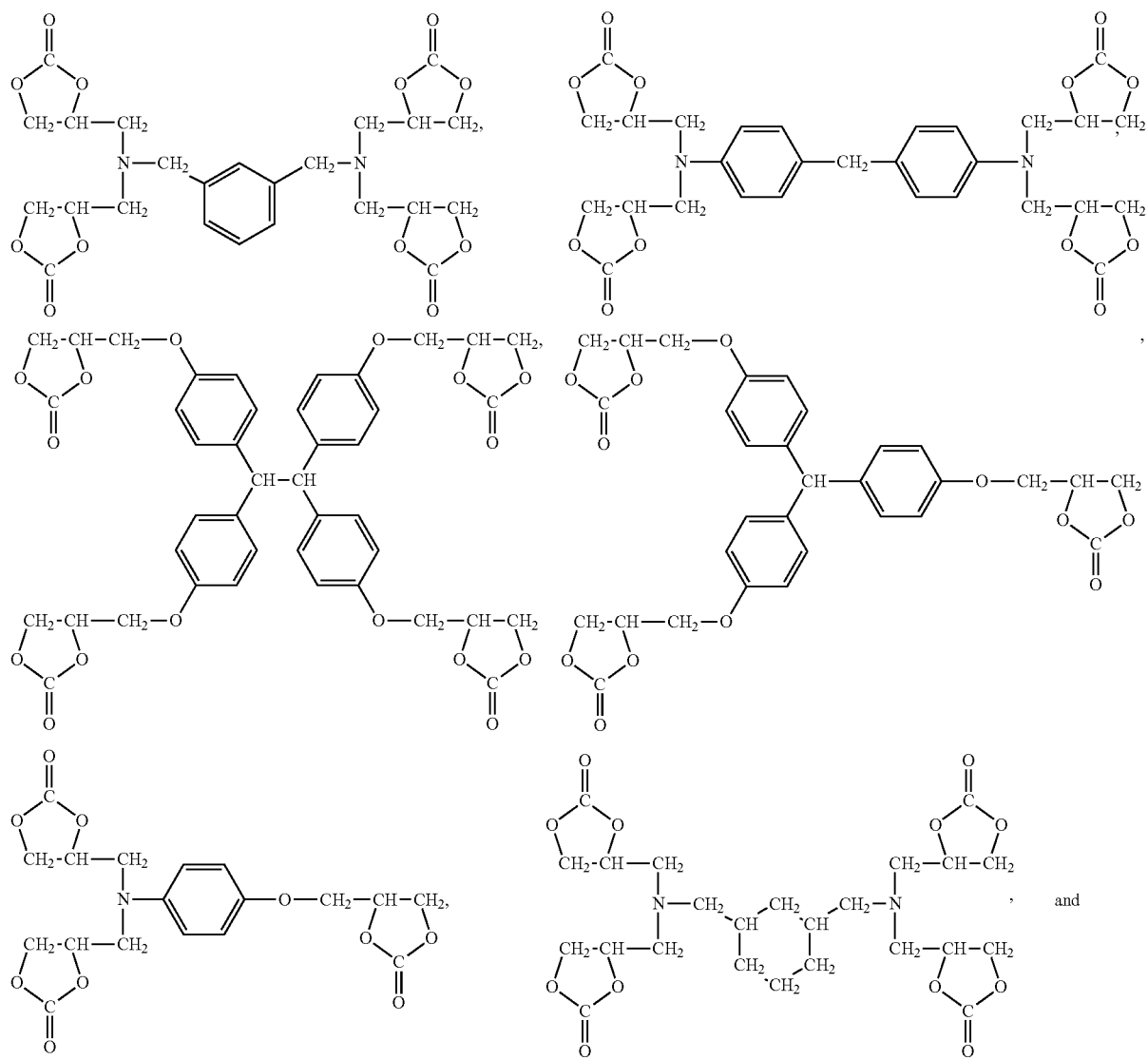
and

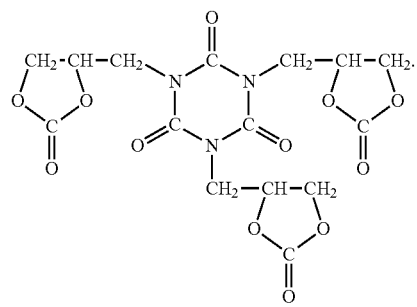

11. Polyhydroxyurethane microparticles,
wherein the polyhydroxyurethane microparticles are spherical polymer microparticles having an average particle size in a range from 5.0 μm to 10.5 μm,
a polymer that forms the polymer microparticles is a product of an addition reaction between a first compound having at least three 5-membered cyclic carbonate groups as reactive groups and a second compound having at least two amino groups as reactive groups,
in a process of the addition reaction, both the first compound and the second compound are present at an equivalent ratio of functional groups in a range from 0.7 to 1.5 as defined by a following equation:

the equivalent ratio of functional groups =(mass of the first compound in a composition×a number of the carbonate groups in the first compound/molecular weight of the first compound)/ (mass of the second compound in the composition×a number of amino groups in the second compound/molecular weight of the second compound)

where the number of the carbonate groups as the functional groups in the first compound means a number of cyclic carbonate structures that the first compound has in a molecule thereof, and the number of the amino groups as the functional groups in the second compound means the number of amino groups that the second compound has in a molecule thereof, and
the polymer comprises therein at least one chemical structure unit selected from the group consisting of a unit of formula (1) and a unit of formula (2), and
—O—CO— bonds present in the chemical structure unit of the formula (1) and the chemical structure unit of the formula (2), respectively, are derived from carbon dioxide

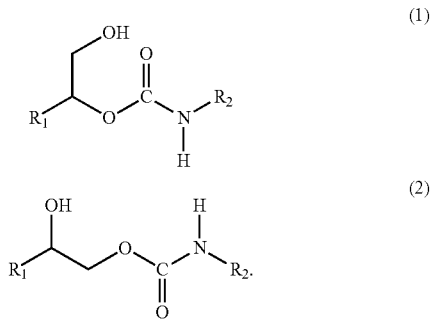

12. The polyhydroxyurethane microparticles according to claim 11,
wherein the —O—CO— bonds present in the chemical structure unit of the formula (1) and the chemical structure unit of the formula (2), respectively, each are derived from, as the reactive group, the 5-membered cyclic carbonate group that incorporates carbon dioxide as one of raw materials, and
the —O—CO— bonds derived from carbon dioxide are contained in an amount range from 1 to 30 mass % in the polymer that forms the polymer microparticles.

13. The polyhydroxyurethane microparticles according to claim 11,
wherein, the first compound is at least one compound selected from the group consisting of

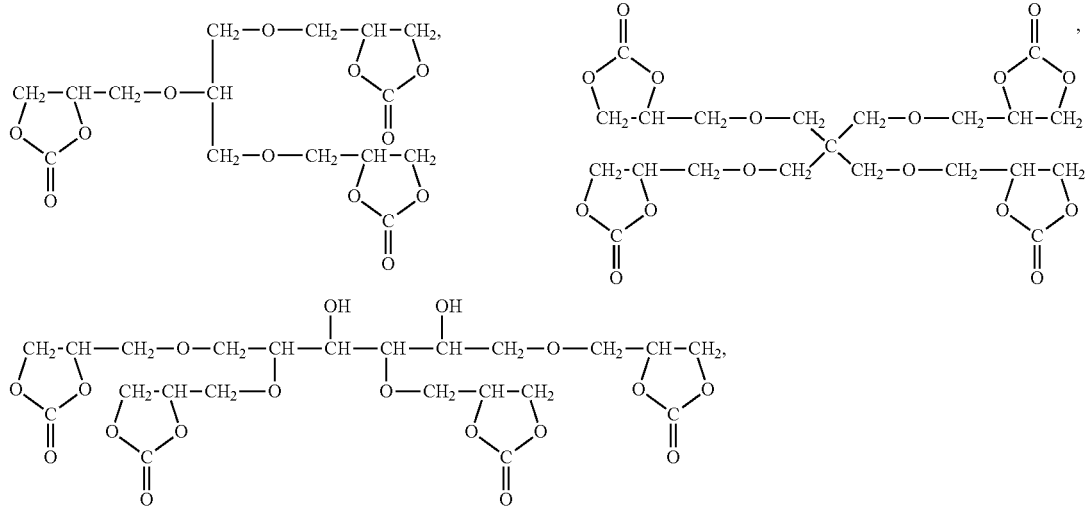

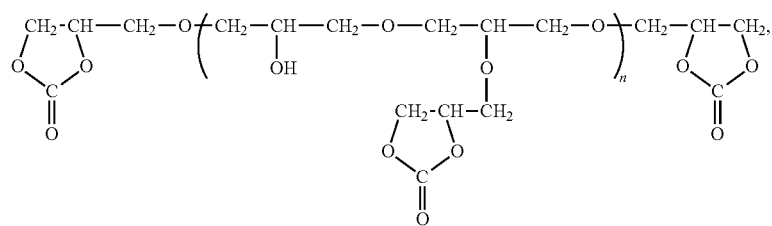
where n is in a range from one to five,
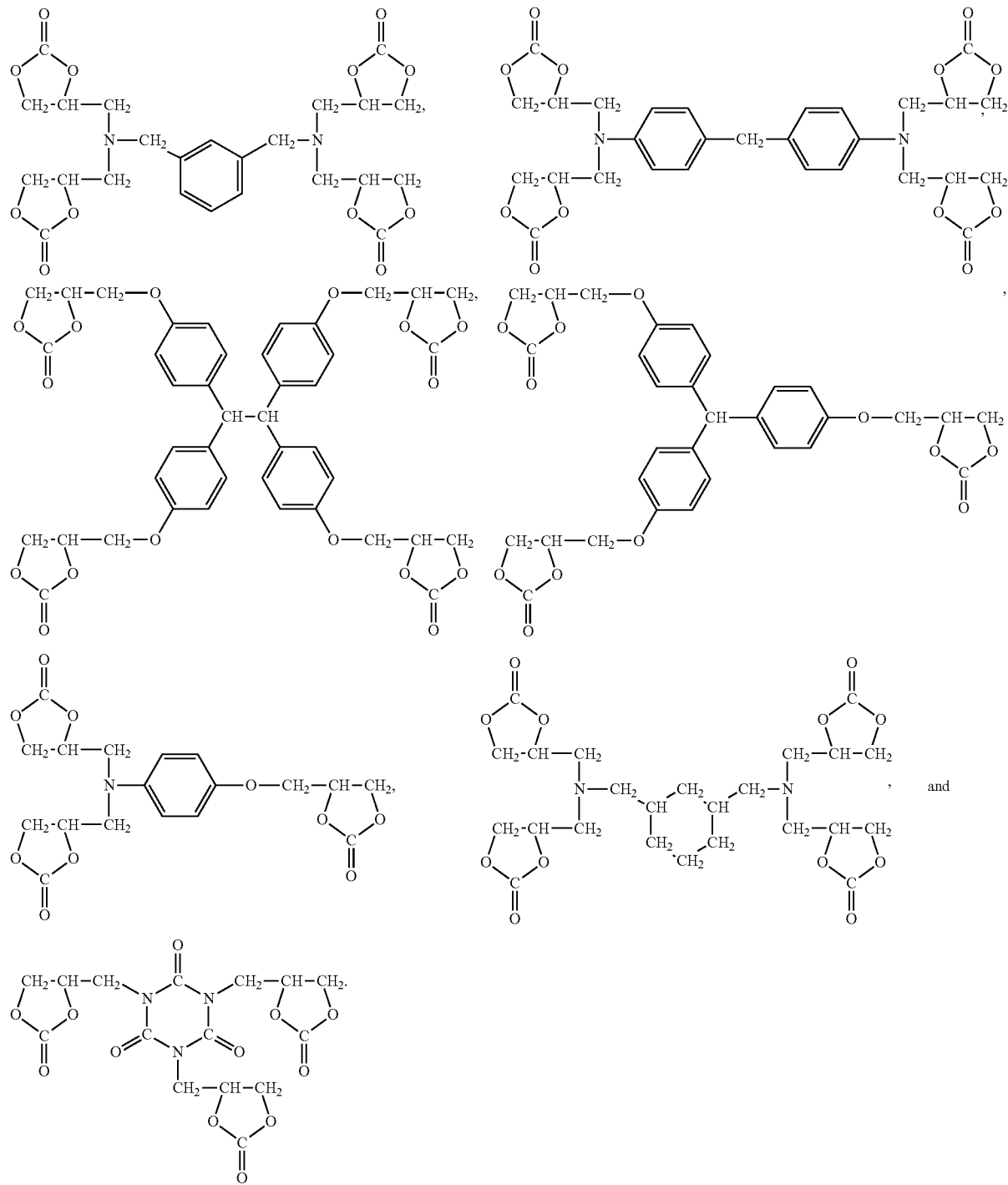

14. The polyhydroxyurethane microparticles according to claim 11,
wherein the polyhydroxyurethane microparticles are in a powder form.

15. The polyhydroxyurethane microparticles according to claim 11,
wherein the polyhydroxyurethane microparticles have a degree of roundness of no lower than 0.94,
wherein the degree of roundness is obtained by a following formulae:

the degree of roundness=a perimeter of a circle as determined from an equivalent circle diameter/a perimeter of a projected microparticle image, where the projected microparticle image is obtained with a particle shape image analyzer.

* * * * *